(12) United States Patent
Han et al.

(10) Patent No.: US 10,966,222 B2
(45) Date of Patent: Mar. 30, 2021

(54) METHOD, DEVICE, AND SYSTEM FOR PROCESSING REFLECTIVE QOS CHARACTERISTICS

(71) Applicant: HUAWEI TECHNOLOGIES CO., LTD., Guangdong (CN)

(72) Inventors: Lifeng Han, Shenzhen (CN); Qinghai Zeng, Shanghai (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/369,233

(22) Filed: Mar. 29, 2019

(65) Prior Publication Data
US 2019/0230681 A1    Jul. 25, 2019

Related U.S. Application Data

(63) Continuation of application No. PCT/CN2017/105046, filed on Sep. 30, 2017.

(30) Foreign Application Priority Data

Sep. 30, 2016 (CN) .......................... 201610875317.9

(51) Int. Cl.
*H04B 7/00* (2006.01)
*H04W 72/12* (2009.01)
(Continued)

(52) U.S. Cl.
CPC ....... *H04W 72/1231* (2013.01); *H04W 24/10* (2013.01); *H04W 36/0072* (2013.01);
(Continued)

(58) Field of Classification Search
CPC .............. H04W 72/08; H04W 72/087; H04W 72/1289; H04W 76/022
(Continued)

(56) References Cited

U.S. PATENT DOCUMENTS 8,094,549 B2 *   1/2012  Bae .......................... H04L 47/10
                                                          370/229
9,125,112 B2 *   9/2015  Gao ....................... H04W 36/22
(Continued)

FOREIGN PATENT DOCUMENTS

| CN | 101796865 A | 8/2010 |
| CN | 102791007 A | 11/2012 |
| CN | 103096314 A | 5/2013 |
| CN | 103581047 A | 2/2014 |
| CN | 104349471 A | 2/2015 |

OTHER PUBLICATIONS

3GPP TS 23.139 v13.0.0 (Dec. 2015), pp. 1-88.*
(Continued)

*Primary Examiner* — Dmitry Levitan
(74) *Attorney, Agent, or Firm* — Fish & Richardson P.C.

(57) ABSTRACT

According to the embodiments of the present disclosure, a core network control plane device sends quality of service (QoS) information to a radio access network device, wherein the QoS information includes an indication information that indicates that a parameter of uplink QoS of the traffic is obtained based on a parameter of downlink QoS of the traffic, the radio access network device establishes a correspondence between a flow and a radio bearer based on the QoS information for a terminal; and the radio access network device receives data of the traffic that is sent from the terminal by using the radio bearer.

18 Claims, 13 Drawing Sheets

(51) Int. Cl.
*H04W 76/12* (2018.01)
*H04W 24/10* (2009.01)
*H04W 36/00* (2009.01)
*H04W 28/02* (2009.01)

(52) U.S. Cl.
CPC ....... *H04W 72/1268* (2013.01); *H04W 76/12* (2018.02); *H04W 28/0263* (2013.01)

(58) Field of Classification Search
USPC .................................. 370/310, 328, 329, 332
See application file for complete search history.

(56) References Cited

U.S. PATENT DOCUMENTS

| | | | |
|---|---|---|---|
| 9,578,647 B2* | 2/2017 | Touati ................... | H04W 76/12 |
| 9,992,705 B2* | 6/2018 | Sankar .................. | H04W 28/20 |
| 2011/0222399 A1 | 9/2011 | Shi et al. | |
| 2011/0244786 A1 | 10/2011 | Fujii et al. | |
| 2014/0233380 A1* | 8/2014 | Kim ...................... | H04W 28/24 |
| | | | 370/230 |
| 2015/0063101 A1 | 3/2015 | Touati et al. | |
| 2015/0098323 A1 | 4/2015 | Lim et al. | |
| 2016/0150513 A1 | 5/2016 | Wu et al. | |
| 2016/0255568 A1 | 9/2016 | Zhang et al. | |

OTHER PUBLICATIONS

PCT International Search Report and Written Opinion issued in International Application No. PCT/CN2017/105046 dated Dec. 28, 2017, 16 pages (with English translation).

Office Action issued in Chinese Application No. 201810850375.5 dated May 29, 2019, 19 pages (with English translation).
S2-162894—Intel et al., "Update to QoS framework solution in clause 6.2.2 in the light of the QoS Work Tasks," SA WG2 Meeting #115, May 23-27, 2016, Nanjing, P.R. China, 10 pages.
S2-163427—Intel, "Summary of email discussion on QoS framework," SA WG2 Meeting #116, Jul. 11-15, 2016, Vienna, AT, 16 pages.
S2-163672—Intel, "Update to Solution 2.2," SA WG2 Meeting #116, Jul. 11-15, 2016, Vienna, AT, 8 pages.
S2-166635—CATT, "Update to the interim agreements of Reflective QoS," SA WG2 Meeting #118, Nov. 14-18, 2016, Reno, Nevada, USA, 5 pages.
3GPP TR 23.799 V0.7.0 (Aug. 2016), "3rd Generation Partnership Project; Technical Specification Group Services and System Aspects; Study on Architecture for Next Generation System (Release 14)," Technical Report, Aug. 2016, 332 pages.
Extended European Search Report issued in European Application No. 17855042.2 dated Aug. 2, 2019, 10 pages.
Office Action issued in Chinese Application No. 201810850375.5 dated Oct. 8, 2019, 7 pages (with English translation).
Search Report issued in Chinese Application No. 201810850375.5 dated Sep. 25, 2019, 3 pages (with English translation).
3GPP TR 23.799 V1.0.0 (Sep. 2016), "3rd Generation Partnership Project; Technical Specification Group Services and System Aspects; Study on Architecture for Next Generation System (Release 14)," Sep. 2016, 423 pages.
Office Action issued in Japanese Application No. 2019-517283 dated Jun. 8, 2020, 6 pages (with English translation).
SA WG2,TR 23.799 "Study on Architecture for Next Generation System for Information," 3GPP TSG SA Meeting #73, SP-160667, New Orleans, USA, Sep. 21-23, 2016, 2 pages.

* cited by examiner

METHOD, DEVICE, AND SYSTEM FOR PROCESSING REFLECTIVE QOS CHARACTERISTICS

CROSS-REFERENCE TO RELATED APPLICATIONS

This application is a continuation of International Application No. PCT/CN2017/105046, filed on Sep. 30, 2017, which claims priority to Chinese Patent Application No. 201610875317.9, filed with the Chinese Patent Office on Sep. 30, 2016 and entitled "METHOD, APPARATUS, AND SYSTEM, TERMINAL, AND ACCESS NETWORK DEVICE FOR COMMUNICATION". The disclosures of the aforementioned applications are hereby incorporated by reference in their entireties.

TECHNICAL FIELD

The present invention relates to the field of communication technologies, and in particular, to a method, apparatus, system, terminal, and access network device for communication.

BACKGROUND

To ensure quality of traffics, an end-to-end quality of service (English: Quality of Service, QoS for short) mechanism is usually used in an existing Long Term Evolution (English: Long Term Evolution, LTE for short) system. In this mechanism, when a terminal initiates a traffic whose QoS needs to be ensured, a dedicated bearer needs to be established for the terminal, to transmit data of the traffic.

The dedicated bearer includes a radio bearer between the terminal and an evolved NodeB (English: evolved NodeB, eNB for short) and a ground side channel between the eNB and a network side device. A process of establishing the dedicated bearer is as follows: When initiating the traffic, the terminal first interacts with an application server by using a default bearer. The application server triggers a policy and charging rules function (English: Policy and Charging Rules Function, PCRF for short) unit to generate a QoS parameter, and notifies a mobility management entity (English: Mobility Management Entity, MME for short) of the generated QoS parameter. Then the MME sends the QoS parameter to the eNB. After receiving the QoS parameter, the eNB establishes the dedicated bearer based on the received QoS parameter. Then the terminal can send the traffic data on the established dedicated bearer.

However, the terminal needs to wait for completion of a process of allocating the QoS parameter, and can send the traffic data only after the dedicated bearer is established based on the QoS parameter. Therefore, a data transmission start speed of an uplink traffic is relatively low, and a requirement for reducing a traffic latency cannot be met.

SUMMARY

To resolve a problem in the prior art that a data transmission start speed of an uplink traffic is relatively low, embodiments of the present invention provide a method, apparatus, system, a terminal, and an access network device for communication. The technical solutions are as follows:

According to a first aspect, an embodiment of the present invention provides a method for communication, where the method includes:

before initiating a traffic, receiving, by a terminal, first QoS information; and when initiating the traffic, sending, by the terminal, data of the traffic based on the first QoS information by using a radio resource that is configured by an access network device for the traffic, where the radio resource is configured by the access network device based on second QoS information, and both the first QoS information and the second QoS information are configured by a core network control plane device for the traffic of the terminal before the terminal initiates the traffic.

According to this embodiment of the present invention, before the terminal initiates the traffic, QoS information (including the first QoS information and the second QoS information) is allocated to the terminal, and the allocated QoS information is sent to the terminal and the access network device. When initiating the traffic, the terminal may directly send the data by using the radio resource that is configured by the access network device based on the allocated QoS information. In other words, the access network device may configure the radio resource for the terminal based on the QoS information that is allocated in advance before the traffic is initiated, without waiting for allocation of authorized QoS information performed by a core network device and triggered when the terminal initiates the traffic, and the terminal may send the data of the traffic based on the corresponding QoS information by using the configured radio resource, so that a traffic start time of the terminal can be shortened.

In a first possible implementation of the first aspect, if the access network device pre-configures, based on the second QoS information, a radio resource for a data packet group corresponding to the traffic, when initiating the traffic, the terminal may send the data of the traffic by directly using the radio resource pre-configured by the access network device.

In a second possible implementation of the first aspect, if the access network device does not pre-configure, based on the second QoS information, a radio resource for a data packet group corresponding to the traffic, when initiating the traffic, the terminal may request the access network device to configure a radio resource for the traffic, and then send the data of the traffic by using a radio resource configured by the access network device. Therefore, in this implementation, the method further includes: sending, by the terminal, QoS request information to the access network device, so that the access network device configures a radio resource for the traffic of the terminal based on the QoS request information.

The first QoS information includes at least one of first pre-authorized QoS information and reflective characteristic information, and the reflective characteristic information includes a downlink QoS parameter of the traffic and indication information that is used to indicate a capability of obtaining an uplink QoS parameter based on the downlink QoS parameter of the traffic. In this embodiment of the present invention, the pre-authorized QoS information (including the first pre-authorized QoS information and second pre-authorized QoS information in the following specification) is proactively configured by the core network control plane device for the terminal based on subscription information of the terminal or based on a common traffic (such as email or Taobao).

With reference to the second possible implementation, in a third possible implementation, the QoS request information includes uplink QoS information. If the first QoS information of the traffic received by the terminal includes both the first pre-authorized QoS information and the reflective characteristic information of the traffic, the terminal may select, depending on actual needs, which QoS information is used to request a radio resource. In other words, the uplink QoS information may include at least a part of the first pre-authorized QoS information, to request the access network device to configure a radio resource based on the second pre-authorized QoS information, or the uplink QoS information may include a QoS parameter obtained based on the downlink QoS parameter of the traffic, to request the access network device to configure a radio resource based on the reflective characteristic information of the traffic.

Further, the terminal may determine, based on a sequence of receiving the first pre-authorized QoS information and the reflective characteristic information of the traffic, which QoS information is used to request a radio resource. Specifically, the terminal may send the QoS request information by using uplink QoS information corresponding to information that is obtained latterly. Specifically, if the terminal first receives the first pre-authorized QoS information and then receives the reflective characteristic information, the uplink QoS information includes the QoS parameter obtained based on the downlink QoS parameter of the traffic, or if the terminal first receives the reflective characteristic information and then receives the first pre-authorized QoS information, the uplink QoS information includes at least a part of the first pre-authorized QoS information.

Optionally, the QoS request information may further include PDU session information of the traffic, so that the access network device subsequently forwards, to a core network user plane device based on the PDU session information of the traffic, the data sent by the terminal.

In some embodiments, the reflective characteristic information includes a downlink QoS parameter of the traffic and indication information that is used to indicate a capability of obtaining an uplink QoS parameter based on the downlink QoS parameter of the traffic. In addition, for some downlink traffics, during establishment of the traffics, the access network device not only configures a downlink radio resource for the terminal, but also configures an uplink radio resource for the terminal. In this case, the reflective characteristic information may further include configuration information of an uplink radio bearer. If the terminal subsequently sends the data of the traffic by using the QoS parameter obtained based on the downlink QoS parameter of the traffic, the terminal may directly send the data of the traffic on a configured radio bearer.

In an actual application, the terminal may send the QoS request information by using control plane signaling.

With reference to the third possible implementation, in a fourth possible implementation, the method may further include: receiving, by the terminal, updated reflective characteristic information sent by the access network device, where the updated reflective characteristic information is carried in a data packet header or is sent by using radio resource control RRC signaling.

With reference to the first to the fourth possible implementations, in a fifth possible implementation, the method further includes: receiving, by the terminal, updated first pre-authorized QoS information sent by the core network control plane device, and updating the locally stored first pre-authorized QoS information based on the updated first pre-authorized QoS information. The updated first pre-authorized QoS information may be sent by the core network control plane device in an area update procedure, or the updated first pre-authorized QoS information may be sent by the core network control plane device in a process in which the terminal is handed over between different access network devices.

In a sixth possible implementation, the sending, by the terminal, data of the traffic based on the first QoS information by using a radio resource that is configured by an access network device for the traffic may include the following two manners:

A first manner: filtering, by the terminal, the data of the traffic by using a packet filter indicated by the first QoS information; and sending, by the terminal, a selected data packet to the access network device by using a radio bearer corresponding to the packet filter indicated by the first QoS information.

A second manner:

determining a radio bearer corresponding to the traffic; and sending the data of the traffic to the access network device by using the determined radio bearer.

Further, if the terminal sends the data of the traffic based on the first pre-authorized QoS information, in an implementation, the first pre-authorized QoS information may include a packet filter of at least one data packet group and an identifier of a QoS parameter corresponding to the at least one data packet group. In another implementation, the first pre-authorized QoS information may include application layer information of the traffic and a QoS parameter identifier of the traffic, and a correspondence between a QoS parameter identifier and application layer information of the traffic. The application layer information of the traffic may be an application program ID, so that the terminal may group the data based on the application layer information.

When the first pre-authorized QoS information includes the packet filter of the at least one data packet group and the QoS parameter identifier corresponding to the at least one data packet group, the sending, by the terminal, the data of the traffic based on the first pre-authorized QoS information includes: filtering, by the terminal, the data of the traffic by using a packet filter indicated by the first pre-authorized QoS information; and sending, by the terminal, the selected data packet to the access network device by using a radio bearer corresponding to the packet filter indicated by the first pre-authorized QoS information.

When the first pre-authorized QoS information includes the QoS parameter identifier and the correspondence between a QoS parameter identifier and a traffic, the sending, by the terminal, the data of the traffic based on the first pre-authorized QoS information includes: determining a radio bearer corresponding to the traffic; and sending the data of the traffic to the access network device by using the determined radio bearer.

According to a second aspect, an embodiment of the present invention further provides a method for communication, the method includes:

receiving, by a first access network device, second QoS information;

configuring, by the first access network device, a radio resource for a terminal based on the second QoS information; and receiving, by the first access network device, data of a traffic that is sent by the terminal by using the radio resource, where the data of the traffic is sent by the terminal based on first QoS information, the first QoS information is received before the terminal initiates the traffic, and both the first QoS information and the second QoS information are configured by a core network control plane device for the traffic of the terminal before the terminal initiates the traffic.

In a first possible implementation of the second aspect, the configuring, by the first access network device, a radio resource for a terminal based on the second QoS information includes: establishing, by the first access network device, a radio bearer and a correspondence between a data packet group and the radio bearer based on the second QoS information, or establishing a correspondence between a data packet group and a radio bearer based on the second QoS information.

In a second possible implementation of the second aspect, the method may further include: receiving, by the first access network device, updated second pre-authorized QoS information sent by the core network control plane device; and updating, by the first access network device, locally stored second pre-authorized QoS information by using the updated second pre-authorized QoS information.

Specifically, the second QoS information includes at least one of the second pre-authorized QoS information and reflective characteristic information, and the reflective characteristic information includes a downlink QoS parameter of the traffic and indication information that is used to indicate a capability of reflection.

In a third possible implementation of the second aspect, the second pre-authorized QoS information may include at least one of first indication information and second indication information, where the first indication information is used to indicate whether to pre-configure a radio resource for a corresponding data packet group, the second indication information is used to indicate whether to pre-establish a ground side channel for a corresponding data packet group, and the ground side channel is a data channel between an access network device and a core network user plane device.

Correspondingly, the configuring, by the first access network device, a radio resource for the terminal based on the second pre-authorized QoS information includes: when the first indication information indicates that a radio resource needs to be pre-configured for the corresponding data packet group, immediately configuring, by the first access network device, a radio resource for the corresponding data packet group based on the second pre-authorized QoS information when receiving the second pre-authorized QoS information. When the terminal initiates the traffic subsequently, the terminal may send the data of the traffic by using the pre-configured radio resource (corresponding to the first possible implementation of the first aspect).

In a fourth possible implementation of the second aspect, the configuring, by the first access network device, a radio resource for the terminal based on the second pre-authorized QoS information includes: receiving, by the first access network device, QoS request information sent by the terminal; and configuring, by the first access network device, a radio resource for the terminal based on the QoS request information (corresponding to the second possible implementation of the first aspect).

Further, the configuring, by the first access network device, a radio resource for the terminal based on the QoS request information includes:

performing, by the first access network device, verification on the QoS request information; and configuring a radio resource for the terminal if the verification on the QoS request information succeeds.

Verification is performed on the QoS request information, and a radio resource is configured for the terminal after the verification succeeds, so that security and properness for resource allocation can be ensured.

In a fifth possible implementation of the second aspect, the method further includes:

sending, by the first access network device, reflective characteristic information of the traffic to the terminal.

Refer to the method for communication in the first aspect for specific content of the QoS request information and the reflective characteristic information, and detailed description is omitted herein.

In a sixth possible implementation of the second aspect, the second pre-authorized QoS information may further include validation range information, where the validation range information is used to indicate a geographic area in which the second pre-authorized QoS information is effective.

In a seventh possible implementation of the second aspect, the method further includes:

sending, by the first access network device to the core network user plane device through a corresponding ground side channel, a data packet sent by the terminal.

The ground side channel is established in a manner that each PDU session is uniquely corresponding to one ground side channel.

In an eighth possible implementation of the second aspect, the receiving, by the first access network device, the second pre-authorized QoS information includes:

receiving, by the first access network device, a handover request message sent by a second access network device, where the handover request message includes the second pre-authorized QoS information.

With reference to the eighth possible implementation, in a ninth possible implementation, the handover request message carries at least one of third indication information and data transmission indication information, where the third indication information is used to indicate whether a radio bearer has been established for a data packet group on a source side, and the data transmission indication information is used to indicate whether data of the data packet group has been transmitted or is being transmitted.

Correspondingly, the configuring, by the first access network device, a radio resource for the terminal based on the second pre-authorized QoS information includes: determining, by the first access network device based on at least one of the following information, whether to configure a radio resource for the terminal: whether the second access network device has established a radio bearer for the data packet group, whether data of the data packet group for which the second access network device has established a radio bearer has been transmitted, and whether the data of the data packet group for which the second access network device has established a radio bearer is being transmitted.

After the first access network device configures a radio resource for the terminal based on the second pre-authorized QoS information in the handover request message, the method further includes:

sending, by the first access network device, a handover response message to the second access network device, where the handover response message includes a handover preparation success message and a handover preparation failure message, the handover preparation success message is used to indicate that the first access network device determines to admit all or some resources requested by the handover request message, and the handover preparation failure message is used to indicate that the first access network device determines not to admit a resource requested by the handover request message.

Further, the handover preparation success message and the handover preparation failure message carry a handover failure cause, where the handover failure cause is one of the following: there is no available radio resource, pre-establishment of a radio bearer with pre-authorized QoS is not supported, a QoS parameter is not supported, and a geographic area is not supported.

According to a third aspect, an embodiment of the present invention further provides a method for communication, the method includes:

configuring, by a core network control plane device, first QoS information and second QoS information for a traffic of a terminal, where the first QoS information and the second QoS information are configured before the terminal initiates the traffic; and sending, by the core network control plane device, the first QoS information to the terminal, and sending the second QoS information to an access network device.

In a possible implementation of the third aspect, the method further includes:

updating, by the core network control plane device, at least one of the first QoS information and the second QoS information in an area update procedure or in a process in which the terminal is handed over between different access network devices; and sending the updated first QoS information to the terminal, and sending the updated second QoS information to the access network device.

In the first aspect, the second aspect, and the third aspect, the first pre-authorized QoS information and the second pre-authorized QoS information are configured by the core network control plane device for the terminal, and may be stored in a context of the terminal and be sent to the terminal and the access network device. In an actual application, the first pre-authorized QoS information may be directly sent to the terminal by using a non-access stratum message, or may be sent to the terminal by the access network device by using an access stratum message. The second pre-authorized QoS information may be sent to the access network device by using an access stratum message.

Before the terminal initiates the traffic, for example, sends a traffic request, pre-authorized QoS information (including the first pre-authorized QoS information and the second pre-authorized QoS information) is allocated to the terminal, and the pre-authorized QoS information is sent to the terminal and the access network device. Therefore, when the terminal initiates the traffic, the access network device may configure a radio resource for the terminal without waiting for authorized QoS information from a core network device, and the terminal may send the data of the traffic by using the configured radio resource, so that a traffic start time of the terminal can be shortened.

During implementation, preferably in an existing signaling procedure, for example, in a PDU session process or a UE initial context setup process, the first pre-authorized QoS information is sent to the terminal, and the second pre-authorized QoS information is sent to the access network device, so that signaling required for QoS parameter allocation can be reduced, and signaling overheads on a network side are reduced.

Optionally, content of the first pre-authorized QoS information and the second pre-authorized QoS information may be the same or different. When the first pre-authorized QoS information is different from the second pre-authorized QoS information, the first pre-authorized QoS information may be a part of the second pre-authorized QoS information, or the first pre-authorized QoS information and the second pre-authorized QoS information partially overlap.

Further, each of the first pre-authorized QoS information and the second pre-authorized QoS information may include one or more sets of QoS information, and each set of QoS information is corresponding to one data packet group. In the following specification, each of content included in the first pre-authorized QoS information and content included in the second pre-authorized QoS information is content included in each set of QoS information. The first pre-authorized QoS information includes a plurality of sets of QoS information, and the second pre-authorized QoS information includes a plurality of sets of QoS information, so that QoS information corresponding to a plurality of data packet groups may be sent to the terminal and the access network device in one time. Network signaling overheads can be reduced compared with the prior art in which a terminal requests to establish a dedicated bearer, and a QoS parameter is configured for one data packet group each time based on a request of the terminal, and is sent to the terminal and the access network device.

In the first aspect, the second aspect, and the third aspect, the core network control plane device notifies the access network device of the reflective characteristic information during establishment of a downlink traffic. Specifically, the core network control plane device notifies the access network device of a downlink QoS parameter of the traffic, and indicates that the traffic has a reflective characteristic, that is, an uplink QoS parameter of the traffic may be obtained based on the downlink QoS parameter of the traffic. Then, the access network device sends the reflective characteristic information of the traffic to the terminal.

Further, the access network device may notify the terminal of the reflective characteristic information of the traffic in one of the following two manners:

In a first manner, the terminal is notified in a user plane manner. For example, the reflective characteristic information is carried in a data packet header of a PDCP layer. Alternatively, the reflective characteristic information may be carried in a header of another protocol layer, for example, carried in a header of an RLC layer or a MAC layer.

In a second manner, the terminal is notified in a control plane manner. For example, the reflective characteristic information is sent to the terminal by using an RRC message, and the message explicitly indicates that the traffic has a reflective characteristic (that is, an uplink QoS parameter of traffic can be obtained based on a donwlink QoS parameter of the traffic). Alternatively, an implicit manner may be used, and an uplink configuration of the radio bearer is used to indicate that the traffic has a reflective characteristic. To be specific, if the access network device carries the uplink configuration of the radio bearer in the reflective characteristic information, it indicates that the traffic has a reflective characteristic.

Optionally, with reference to the first aspect, the second aspect, and the third aspect, in some embodiments, to save a communication resource, when the traffic is terminated, both the access network device and the terminal need to release a related resource configuration.

In an optional implementation, the terminal may detect whether the traffic is terminated. Correspondingly, the method further includes: detecting, by the terminal, whether the traffic is terminated; and when the terminal detects that the traffic is terminated, sending a service termination request to the access network device. Correspondingly, when receiving the service termination request sent by the terminal, the first access network device releases, according to a service release request of the terminal, the radio resource allocated to the traffic, and instructs the terminal to release a radio resource configuration of the traffic.

The terminal may detect traffic termination with the following manner:

when a data volume of the traffic is zero or less than a specified threshold, starting, by the terminal, a timer, and if the data volume of the traffic is not increased when the timer expires, detecting that the traffic is terminated; or if the data volume of the traffic is increased before the timer expires, resetting the timer, and restarting the timer next time when the data volume of the traffic is zero or less than the specified threshold.

Alternatively, the terminal may further detect whether a traffic end instruction of an application layer is received, and when the traffic end instruction is received, it indicates that the traffic is terminated.

Optionally, the timer is set by the core network control plane device, the timer is carried in the first pre-authorized QoS information and is sent to the terminal (for example, is sent to the terminal by using a non-access stratum (NAS) message); or the timer is set by the access network device, and the timer is sent to the terminal by using a radio resource control RRC message or a user plane control protocol data unit PDU.

Optionally, the terminal may send the traffic termination request to the access network device in a control plane or user plane manner. The control plane manner may be a manner of using an RRC message, where the RRC message includes QoS information of a data packet group that needs to be terminated and indication information for requesting traffic termination, and the QoS information is a QoS parameter identifier. The user plane manner may be a manner of using a data packet that indicates that the traffic ends. For example, a PDCP PDU is generated at a PDCP layer, and the PDCP PDU is set to an endmarker PDU, to indicate that the traffic ends. Alternatively, the PDCP PDU carries a QoS parameter identifier and traffic termination indication information, or a format of the PDU is used to indicate that the traffic is terminated. In addition, the access network device may be further notified by using an RLC PDU or a MAC PDU, and a manner of using the RLC PDU and the MAC PDU is similar to that of the PDCP PDU, and details are not described herein again.

In another optional implementation, the access network device may detect whether the traffic is terminated. Correspondingly, the method provided in the second aspect further includes: detecting, by the access network device, whether the traffic is terminated; and when the access network device detects that the traffic is terminated, releasing the radio resource allocated to the traffic, and instructing the terminal to release a radio resource configuration of the traffic.

According to a fourth aspect, an embodiment of the present invention provides a method for communication, where the method includes: sending, by an access network device to a core network control plane device, a data packet, for which no QoS parameter has been configured, that is of a traffic and that is sent by a terminal;

receiving, by the access network device, QoS information sent by the core network control plane device, where the QoS information is generated based on the data packet, of the traffic, for which no QoS parameter has been configured; and configuring, by the access network device, a radio resource for the traffic based on the QoS information.

In a possible implementation of the fourth aspect, the sending, by an access network device to a core network control plane device, a data packet, for which no QoS parameter has been configured, that is of a traffic and that is sent by a terminal includes:

receiving, by the access network device, an access stratum AS message sent by the terminal, where the AS message includes a non-access stratum protocol data unit NAS PDU, and the data packet for which no QoS parameter has been configured is carried in the NAS PDU; and forwarding, by the access network device, the NAS PDU to the core network control plane device.

In a second possible implementation of the fourth aspect, the sending, by an access network device to a core network control plane device, a data packet, for which no QoS parameter has been configured, that is of a traffic and that is sent by a terminal includes:

receiving, by the access network device, the data packet, for which no QoS parameter has been configured, that is of the traffic and that is sent by the terminal by using any one of a signaling radio bearer, a common radio bearer, and a default radio bearer, where the common radio bearer is exclusively configured to send the data packet for which no QoS parameter has been configured, and the data packet, of the traffic, for which no QoS parameter has been configured carries new data indication information; and sending, by the access network device to the core network control plane device, the received data packet, of the traffic, for which no QoS parameter has been configured, where the data packet, of the traffic, for which no QoS parameter has been configured is sent to a core network user plane device through a ground side channel, and then is sent to the core network control plane device by the core network user plane device.

According to a fifth aspect, an embodiment of the present invention further provides a method for communication, where the method includes:

sending, by a terminal to a core network control plane device, a data packet, of a traffic, for which no QoS parameter has been configured;

receiving, by the terminal, radio resource configuration information sent by an access network device, where the radio resource configuration information is configured by the access network device based on received QoS information sent by the core network control plane device, and the QoS information is generated based on the data packet, of the traffic, for which no QoS parameter has been configured; and sending, by the terminal, data of the traffic based on the radio resource configuration information.

In another possible implementation of the fifth aspect, the sending, by a terminal to a core network control plane device, a data packet, of a traffic, for which no QoS parameter has been configured includes:

sending, by the terminal, an access stratum AS message to the access network device, where the AS message includes a non-access stratum protocol data unit NAS PDU, the data packet for which no QoS parameter has been configured is carried in the NAS PDU, and the access network device sends the NAS PDU to the core network control plane device.

In another possible implementation of the fifth aspect, the sending, by a terminal to a core network control plane device, a data packet, of a traffic, for which no QoS parameter has been configured includes:

sending, by the terminal to the access network device by using any one of a signaling radio bearer, a common radio bearer, and a default radio bearer, the data packet, of the traffic, for which no QoS parameter has been configured, so that the access network device forwards the data packet to the core network control plane device, where the common radio bearer is exclusively configured to send the data packet for which no QoS parameter has been configured, and the data packet, of the traffic, for which no QoS parameter has been configured carries new data indication information.

With reference to the fourth aspect and the fifth aspect, in some embodiments, the data packet, for which no QoS parameter has been configured, that is of the traffic and that is transmitted on the signaling radio bearer or the common radio bearer further includes PDU session information of the traffic.

Further, the PDU session information of the traffic is carried in a tunnel protocol header of the data packet, or is carried in an application layer IP header of the data packet, or is carried in a transport layer IP header of the data packet.

With reference to the fourth aspect and the fifth aspect, in some embodiments, the ground side channel is a common bearer or a tunnel, the common bearer is exclusively configured to transmit the data packet, of the traffic, for which no QoS parameter has been configured, and the data packet, for which no QoS parameter has been configured, that is of the traffic and that is transmitted on the tunnel carries new data indication information.

Further, the new data indication information is carried in a tunnel protocol header of the data packet, or is carried in an application layer IP header of the data packet, or is carried in a transport layer IP header of the data packet.

According to a sixth aspect, an embodiment of the present invention provides an apparatus for communication, where the apparatus includes units, such as a sending unit and a receiving unit, for implementing the method of the first aspect.

According to a seventh aspect, an embodiment of the present invention provides an apparatus for communication, where the apparatus includes units, such as a receiving unit and a configuration unit, for implementing the method of the second aspect.

According to an eighth aspect, an embodiment of the present invention provides an apparatus for communication, where the apparatus includes units, such as a configuration unit and a sending unit, for implementing the method of the third aspect.

According to a ninth aspect, an embodiment of the present invention provides an apparatus for communication, where the apparatus includes units, such as a sending unit, a receiving unit, and a configuration unit, for implementing the method of the fourth aspect.

According to a tenth aspect, an embodiment of the present invention provides an apparatus for communication, where the apparatus includes units, such as a sending unit and a receiving unit, for implementing the method of the fifth aspect.

According to an eleventh aspect, an embodiment of the present invention provides a system for communication, where the system includes an access network device and a terminal; the access network device includes an apparatus for communication provided in any possible implementation of the second aspect; and the terminal includes an apparatus for communication provided in any possible implementation of the first aspect.

Further, the system may further include a core network control plane device, where the core network control plane device includes the apparatus for communication provided in any possible implementation of the eighth aspect.

According to a twelfth aspect, an embodiment of the present invention provides a system for communication, where the system includes an access network device and a terminal; the access network device includes an apparatus for communication provided in any possible implementation of the third aspect; and the terminal includes an apparatus for communication provided in any possible implementation of the fourth aspect.

According to a thirteenth aspect, an embodiment of the present invention provides an access network device, where the access network device includes a processor, a memory, and a transceiver; the processor, the memory, and the transceiver are coupled by using a bus; the memory is configured to store a program instruction; and the processor executes the program instruction stored in the memory, so that the access network device can execute the method of the second aspect or the fourth aspect.

According to a fourteenth aspect, an embodiment of the present invention further provides a computer readable medium, configured to store program code executed by an access network device, and the program code includes an instruction for executing the method of the second aspect or the fourth aspect.

According to a fifteenth aspect, an embodiment of the present invention provides a terminal, where the terminal includes a processor, a memory, and a transceiver; the processor, the memory, and the transceiver are coupled by using a bus; the memory is configured to store a program instruction; and the processor executes the program instruction stored in the memory, so that the terminal can execute the method of the first aspect or the fifth aspect.

According to a sixteenth aspect, an embodiment of the present invention further provides a computer readable medium, configured to store program code executed by a terminal, and the program code includes an instruction for executing the method of the first aspect or the fifth aspect.

According to a seventeenth aspect, an embodiment of the present invention provides a core network control plane device, where the core network control plane device includes a processor, a memory, and a communication interface; the processor, the memory, and the transceiver are coupled by using a bus; the memory is configured to store a program instruction; and the processor executes the program instruction stored in the memory, so that the core network control plane device can execute the method of the third aspect.

According to an eighteenth aspect, an embodiment of the present invention further provides a communication chip, applied for a device of mobile communication system, where the communication chip includes a processor, a memory, and a communication interface; the processor, the memory, and the communication interface are coupled by using a bus; the memory is configured to store a program instruction; and the processor executes the program instruction stored in the memory, so that the device of communication system that carries the communication chip can execute the method provided in any possible implementation of the first aspect or the second aspect or the third aspect or the fourth aspect.

According to a nineteenth aspect, an embodiment of the present invention further provides a method for communication, where the method includes:

receiving, by a radio access network device, quality of service information from a core network control plane device, where the quality of service information includes reflective characteristic information, and the reflective characteristic information includes a downlink quality of service parameter of a traffic and indication information that is used to indicate a capability of obtaining an uplink quality of service parameter based on the downlink quality of service parameter of the traffic; configuring, by the radio access network device, a radio resource for a terminal based on the quality of service information; and receiving, by the radio access network device, data of the traffic that is sent from the terminal by using the radio resource.

In a feasible design, the configuring, by the radio access network device, a radio resource for a terminal based on the quality of service information includes: establishing, by the radio access network device, a radio bearer and a correspondence between a data packet group and the radio bearer based on the quality of service information, or establishing, by the radio access network, a correspondence between a data packet group and a radio bearer based on the quality of service information.

In a feasible design, the radio access network device receives updated quality of service information sent by the core network control plane device; and the radio access network device updates the locally stored quality of service information by applying the updated quality of service information.

In a feasible design, the quality of service information further includes at least one of PDU session information and identification information of network slice of the traffic.

In a feasible design, the radio access network device sends the reflective characteristic information of the traffic to the terminal.

In a feasible design, the radio access network device receives a handover request message sent by another radio access network device, where the handover request message includes the quality of service information.

In a feasible design, the handover request message carries at least one of third indication information and data transmission indication information, where the third indication information is used to indicate whether a radio bearer has been established for a corresponding data packet group on a source side, and the data transmission indication information is used to indicate whether data of the corresponding data packet group has been transmitted or is being transmitted.

In a feasible design, the configuring, by the radio access network device, a radio resource for a terminal based on the quality of service information includes: determining, by the radio access network device based on at least one of the following information, whether to configure a radio resource for the terminal: whether the second access network device has established a radio bearer for the data packet group, whether data of the data packet group for which the second access network device has established a radio bearer has been transmitted, and whether the data of the data packet group for which the second access network device has established a radio bearer is being transmitted.

According to a twentieth aspect, an embodiment of the present invention further provides a radio access network device, where the radio access network device includes a processor, a memory, and a transceiver; the processor, the memory, and the transceiver are coupled by using a bus; the memory is configured to store a program instruction; and the processor executes the program instruction stored in the memory, so that the radio access network device performs the method according to any item of the nineteenth aspect.

According to a twenty-first aspect, an embodiment of the present invention further provides a system chip, applicable to a radio access network device, where the system chip includes an input/output interface, at least one processor, a memory, and a bus; the input/output interface, the at least one processor, and the memory communicate with each other by using the bus; the memory stores a program instruction; the input/output interface is used by the system chip to receive data from and send data to outside; and the at least one processor invokes the program instruction stored in the memory, to perform an operation of the radio access network device in the method according to any item of the nineteenth aspect.

According to a twenty-second aspect, an embodiment of the present invention further provides a computer program product, applicable to a radio access network device, where the computer program product includes an instruction, and the instruction is executed to perform an operation of the radio access network device in the method according to any item of the nineteenth aspect.

According to a twenty-third aspect, an embodiment of the present invention further provides a computer readable storage medium, applicable to a radio access network device, where the computer readable storage medium stores an instruction, and the instruction is executed to perform an operation of the radio access network device in the method according to any item of the nineteenth aspect.

According to a twenty-fourth aspect, an embodiment of the present invention further provides a mobile communication system, where the system includes the radio access network device according to the twentieth aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the implementations of the present invention in detail with reference to the accompanying drawings.

A "module" mentioned in this specification is a program or an instruction that is stored in a memory and can implement some functions. A "unit" mentioned in this specification is a functional structure divided based on logic. The "unit" may be implemented by only hardware, or implemented by a combination of software and hardware.

"A plurality of" in this specification means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
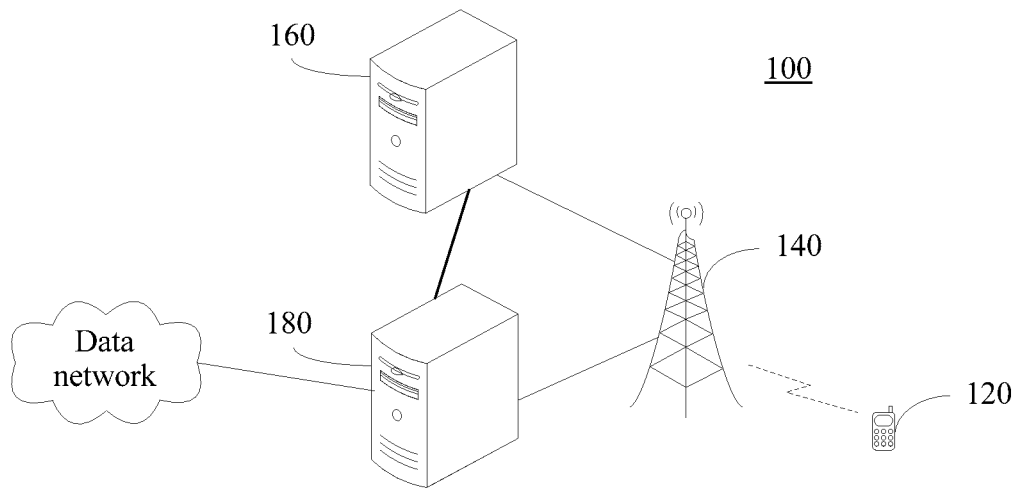
FIG. 1 is a schematic architectural diagram of a communication system according to an embodiment of the present invention.

FIG. 1 is a schematic structural diagram of a communication system 100 according to an embodiment of the present invention. The communication system 100 may be an LTE system, a 5G system, or a subsequent evolved system of the 5G system. The communication system 100 includes: at least one terminal 120, at least one access network device 140, at least one core network control plane device 160, and at least one core network user plane device 180. The terminal 120 may be separately connected to the core network control plane device 160 and the core network user plane device 180 by using the access network device 140. The core network user plane device 180 is connected to a data network. Therefore, a data access service may be provided for the terminal 120 by using the access network device 140, the core network control plane device 160, and the core network user plane device 180.

The terminal 120 may be a device such as a personal communication service (English: Personal Communication Service, PCS for short) phone, a cordless telephone set, a Session Initiation Protocol (English: Session Initial Protocol, SIP for short) phone, a wireless local loop (English: Wireless Local Loop, WLL for short) station, or a personal digital assistant (English: Personal Digital Assistant, PDA for short). The terminal may also be referred to as a system, a subscriber unit (Subscriber Unit), a subscriber station (Subscriber Station), a mobile station (Mobile Station), a mobile console (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The terminal 120 communicates with one or more access network devices 140 by using a radio access network (English: Radio Access Network, RAN for short).

The access network device 140 serves as a router between the terminal 120 and a remaining part of the access network, where the remaining part of the access network may include an Internet Protocol (English: Internet Protocol, IP for short) network. The access network device 140 may further coordinate attribute management for an air interface. For example, the access network device 140 may be a base transceiver station (English: Base Transceiver Station, BTS for short) in a Global System for Mobile Communications (English: Global System for Mobile Communication, GSM for short) or a Code Division Multiple Access (English: Code Division Multiple Access, CDMA for short) system, or a NodeB (NodeB) in Wideband Code Division Multiple Access (English: Wideband Code Division Multiple Access, WCDMA for short) system, or an eNB in LTE system. This is not limited in the present invention.

The core network control plane device 160 has functions such as session management, mobility management, QoS control, and subscription information management for the terminal. For example, the core network control plane device may be a serving GPRS support node (English: Serving GPRS Support Node, SGSN for short) in the GSM or CDMA system, or may be an MME in the LTE system.

The core network user plane device 180 has a function such as data forwarding. For example, the core network user plane device may be a gateway GPRS support node (English: Gateway GPRS Support Node, GGSN for short) in the GSM or CDMA system, or may be a PDN gateway (English: PDN GateWay, PGW for short) and a serving gateway (English: Serving GateWay, SGW for short) in the LTE system.

The data network is a data network outside a 3rd Generation Partnership Project (English: 3rd Generation Partnership Project, 3GPP for short) network, and is used to provide the terminal with a data traffic, such as the Internet or an enterprise private network.

An application scenario to which a method for communication provided in the embodiments of the present invention is applicable includes but is not limited to a single-link scenario, a multi-link scenario, a relay (English: Relay) scenario, and a device-to-device (English: Device to Device, D2D for short) scenario. The single-link scenario is that one terminal device is linked to one access network device, the multi-link scenario is that one terminal device is linked to at least two access network devices, and the relay scenario is that a terminal device is linked to an access network device by using a relay device (such as a relay base station).

It should be noted that, in this embodiment of the present invention, uplink data is data that is sent from the terminal to the access network device through a radio interface, then from the access network device to the core network user plane device under control of the core network control plane device, and is finally sent to an external data network; and downlink data is data that is sent to the terminal by the core network user plane device through the access network device, is successively submitted upward through a data channel in the terminal, and is finally submitted to an upper layer APP.

The following describes a terminal, an access network device, and a core network control plane device provided in embodiments of the present invention with reference to specific hardware structures.

Figure 2:
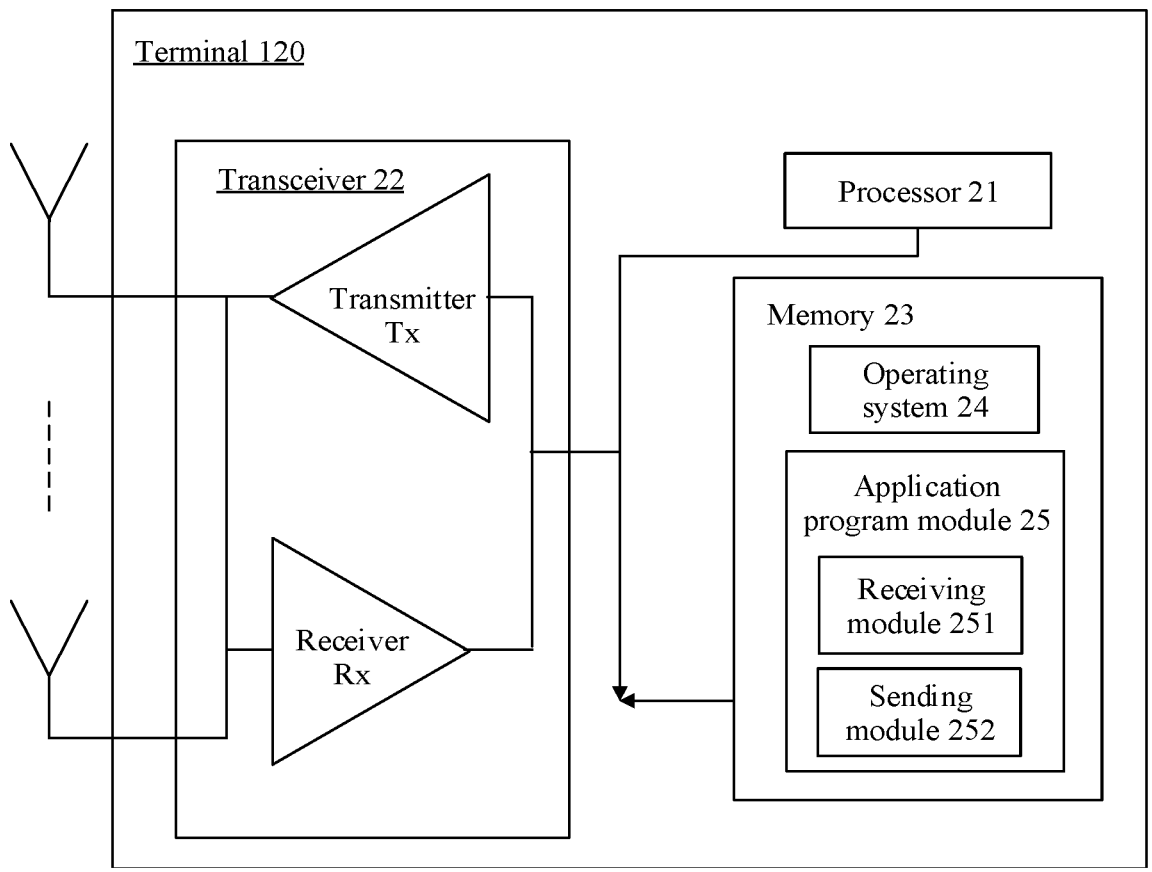
FIG. 2 is a schematic diagram of a hardware structure of a terminal according to an embodiment of the present invention.

FIG. 2 is a hardware structure of a terminal 120 according to an embodiment of the present invention. As shown in FIG. 2, the terminal 120 includes a processor 21, a transceiver 22, and a memory 23.

The processor 21 includes one or more processing cores. The processor 21 runs a software program and module, to execute various function applications and information processing.

The transceiver 22 includes a receiver Rx and a transmitter Tx. The transceiver 22 may be further implemented as a communication chip. The communication chip may include a receiving module, a transmitting module, a modulation/demodulation module, and the like, and is configured to modulate/demodulate information, and receive or send the information by using a radio signal.

The transceiver 22, the memory 23, and the processor 21 are coupled by using a bus. The memory 23 may be configured to store a software program and module. The memory may store an operating system 24 and an application program module 25 that is required by at least one function.

The application program module 25 includes at least a receiving module 251 for receiving information and a sending module 252 for sending information. The receiving module 251 is configured to receive first QoS information before the terminal initiates a traffic; and the sending module 252 is configured to: when the traffic is initiated, send data of the traffic based on the first QoS information by using a radio resource that is configured by an access network device for the traffic, where the radio resource is configured by the access network device based on second QoS information, and both the first QoS information and the second QoS information are configured by a core network control plane device for the traffic of the terminal before the terminal initiates the traffic.

Optionally, the processor 21 is configured to execute the modules in the application program module 25, and implement steps that need to be performed by the terminal in FIG. 5, FIG. 6, FIG. 7, FIG. 8, FIG. 9a, and FIG. 9b.

Alternatively, the sending module 251 is configured to send, to a core network control plane device, a data packet, of a traffic, for which no QoS parameter has been configured; the receiving module 252 is configured to receive radio resource configuration information sent by an access network device, where the radio resource configuration information is configured by the access network device based on received QoS information sent by the core network control plane device, and the QoS information is generated based on the data packet, of the traffic, for which no QoS parameter has been configured; and the sending module 251 is further configured to send data of the traffic based on the radio resource configuration information.

Figure 10:
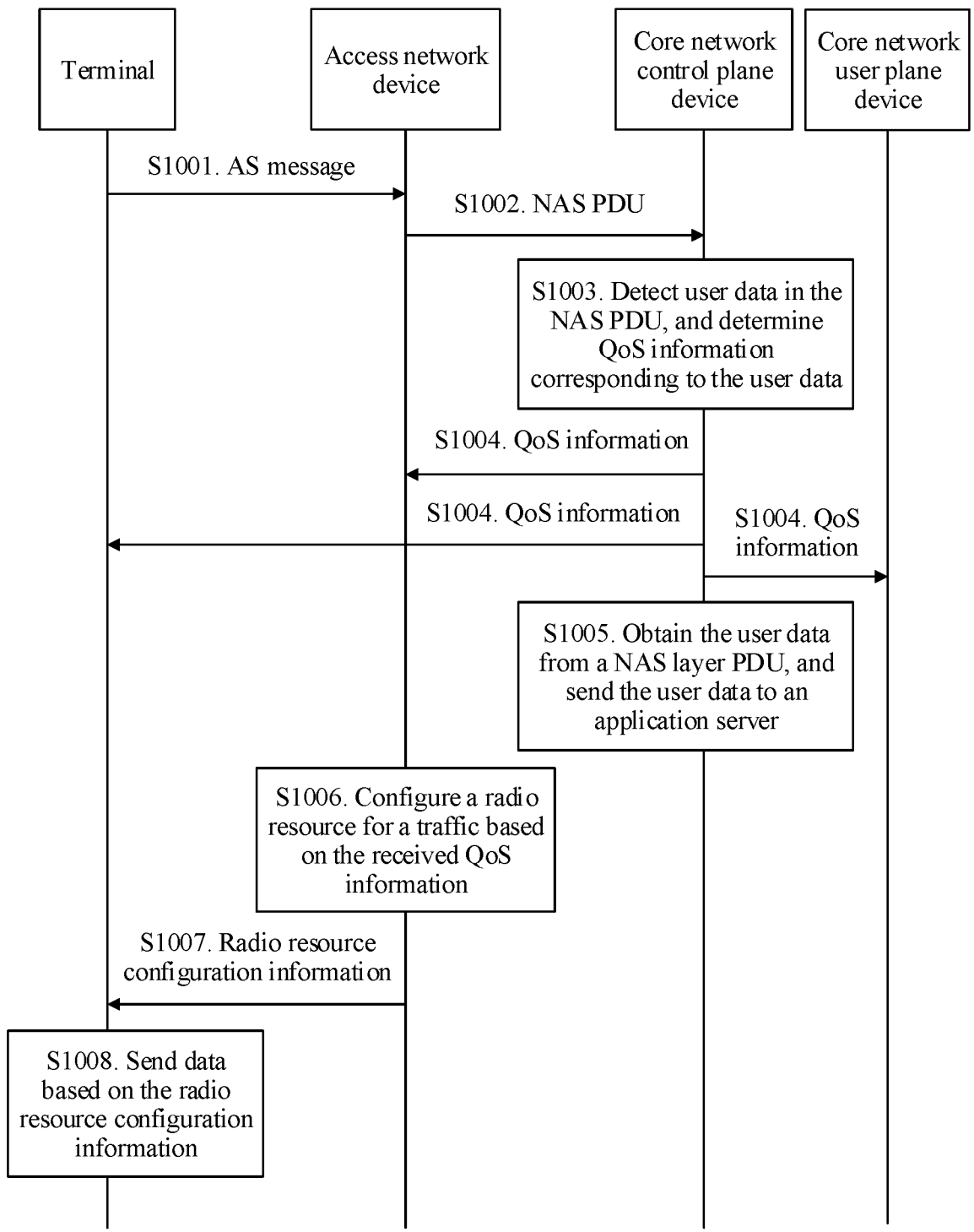
FIG. 10 is a flowchart of another method for communication according to an embodiment of the present invention.
Figure 11:
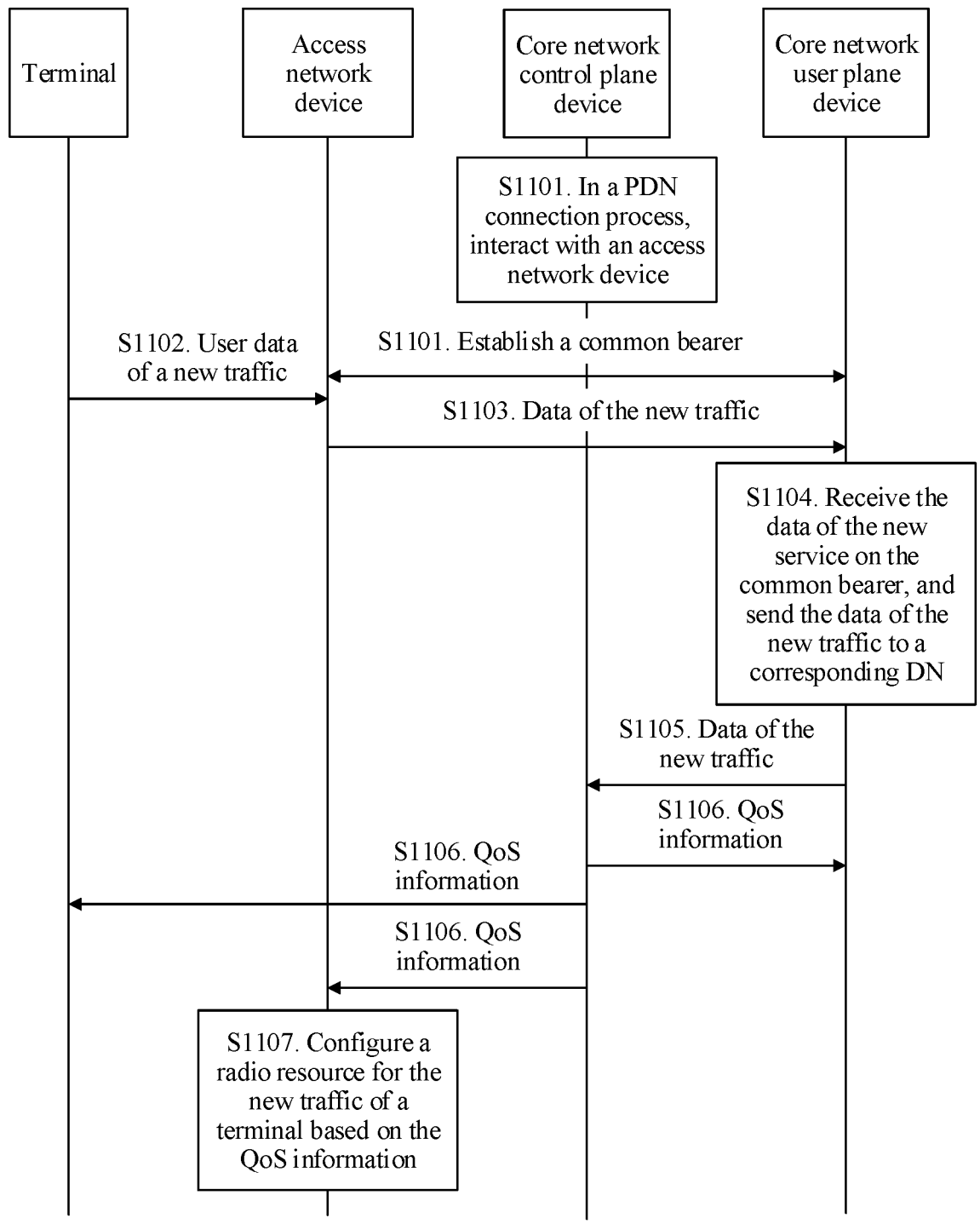
FIG. 11 is a flowchart of another method for communication according to an embodiment of the present invention.

Correspondingly, the processor 21 is configured to execute the modules in the application program module 25, and implement steps that need to be performed by the terminal in FIG. 10 and FIG. 11.

In addition, the memory 23 is a computer readable storage medium, and may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art can understand that the structure of the terminal 120 shown in FIG. 2 constitutes no limitation on the terminal, and the terminal may include more or fewer components than those shown in the figure, or some components may be combined, or the components may be disposed in a different manner.

Figure 3:
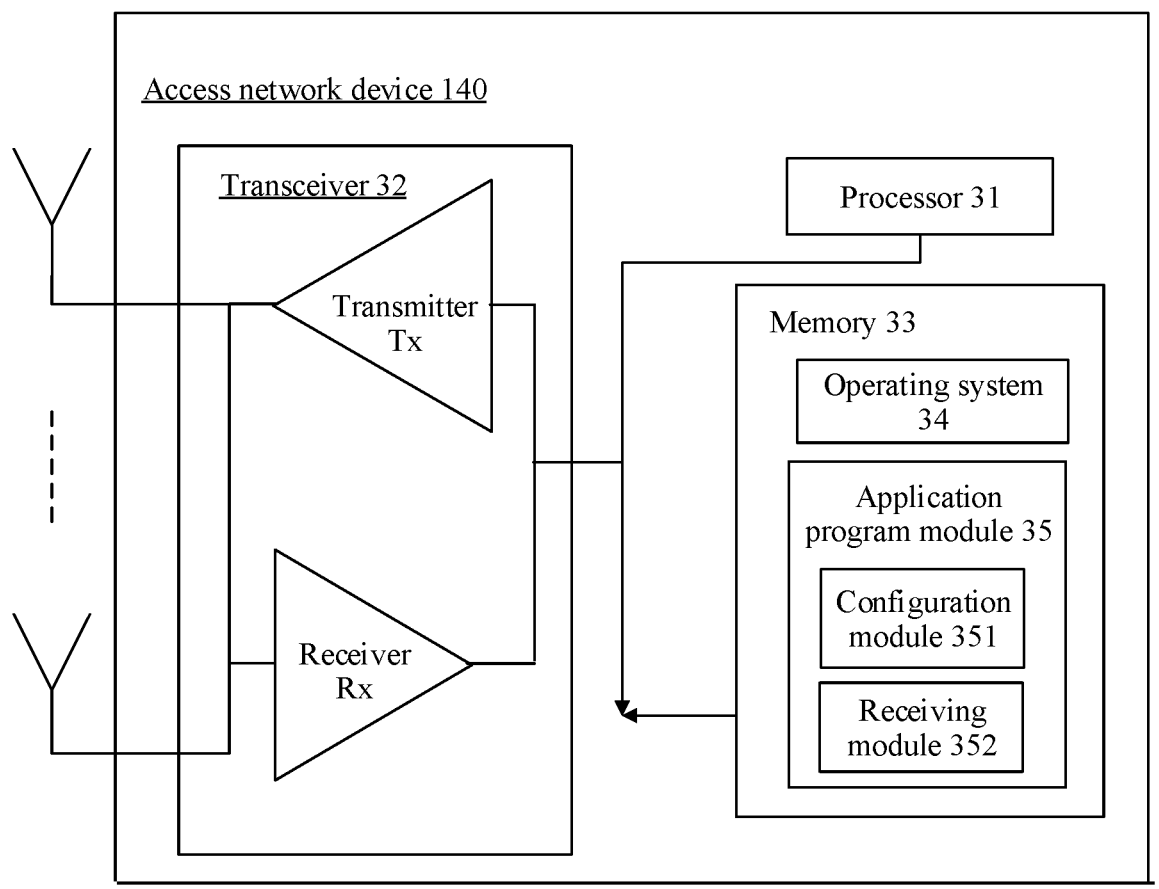
FIG. 3 is a schematic diagram of a hardware structure of an access network device according to an embodiment of the present invention.

FIG. 3 shows a hardware structure of an access network device 140 according to an embodiment of the present invention. Referring to FIG. 3, the access network device 140 includes a processor 31, a transceiver 32, and a memory 33.

The processor 31 includes one or more processing cores. The processor 31 runs a software program and module, to execute various function applications and information processing.

The transceiver 32 includes a receiver Rx and a transmitter Tx. The transceiver 32 may be further implemented as a communication chip. The communication chip may include a receiving module, a transmitting module, a modulation/demodulation module, and the like, and is configured to modulate/demodulate information, and receive or send the information by using a radio signal.

The transceiver 32, the memory 33, and the processor 31 are coupled by using a bus. The memory 33 may be configured to store a software program and module. The memory may store an operating system 34 and an application program module 35 that is required by at least one function. The application program module 35 includes at least a receiving module 352 for receiving information and a configuration module 351 for processing the information. The receiving module 352 is configured to receive second QoS information; the configuration module 351 is configured to configure a radio resource for a terminal based on the second QoS information; the receiving module 352 is further configured to receive data of a traffic that is sent by the terminal by using the radio resource, where the data of the traffic is sent by the terminal based on first QoS information, the first QoS information is received before the terminal initiates the traffic, and both the first QoS information and the second QoS information are configured by a core network control plane device for the traffic of the terminal before the terminal initiates the traffic.

Optionally, the processor 31 is configured to execute the modules in the application program module 35, and implement steps that need to be performed by the access network device in FIG. 5, FIG. 6, FIG. 7, FIG. 8, FIG. 9a, FIG. 9b, FIG. 10, and FIG. 11.

Alternatively, the application program module 35 includes at least a sending module for sending information, a receiving module for receiving information, and a configuration module for processing information. The sending module is configured to send, to a core network control plane device, a data packet, for which no QoS parameter has been configured, that is of a traffic and that is sent by a terminal; the receiving unit is configured to receive QoS information sent by the core network control plane device, where the QoS information is generated based on the data packet, of the traffic, for which no QoS parameter has been configured; and the configuration unit is configured to configure a radio resource for the traffic based on the QoS information received by the receiving unit.

Correspondingly, the processor 31 is configured to execute the modules in the application program module 35, and implement steps that need to be performed by the access network device in FIG. 5, FIG. 6, FIG. 7, FIG. 8, FIG. 9a, and FIG. 9b.

In addition, the memory 33 is a computer readable medium, and may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art can understand that the structure of the access network device 140 shown in FIG. 3 constitutes no limitation on the access network device, and the access network device may include more or fewer components than those shown in the figure, or some components may be combined, or the components may be disposed in a different manner.

Figure 4:
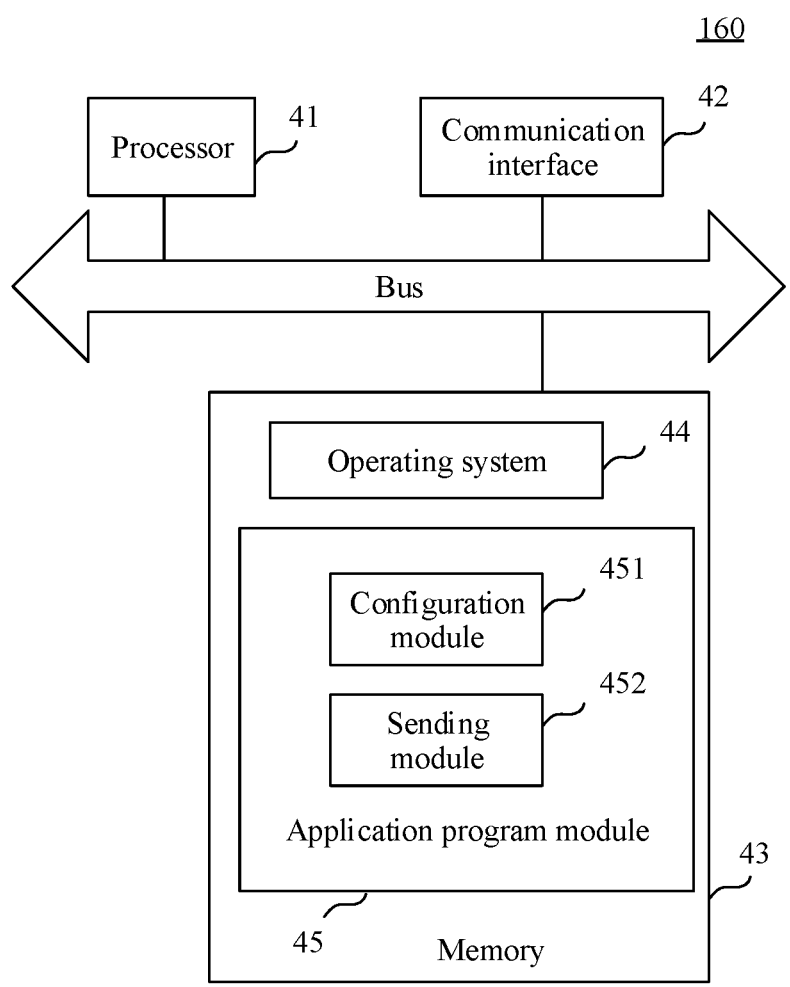
FIG. 4 is a schematic diagram of a hardware structure of a core network control plane device according to an embodiment of the present invention.

FIG. 4 is a diagram of a hardware structure of a core network control plane device 160 according to an embodiment of the present invention. Referring to FIG. 4, the core network control plane device 160 may include parts such as a processor 41 with one or more processing cores, a memory 42 including one or more computer readable storage media, and a communication interface 43. The processor 41 may be connected to the memory 42 and the communication interface 43 by using a bus. A person skilled in the art can understand that the structure shown in FIG. 4 constitutes no limitation on the core network control plane device 160, and the core network control plane device 160 may include more or fewer components than those shown in the figure, or some components may be combined, or the components may be disposed in a different manner.

The processor 41 is a control center of the core network control plane device 160, connects to all components of the whole core network control plane device 160 by using various interfaces and circuits, and executes functions of the core network control plane device 160 and processes data by running or executing a software program and/or an application program module stored in the memory 42 and invoking data stored in the memory 42, to perform overall monitoring on the core network control plane device 160. Optionally, the processor 41 may include one or more processing units. The processing unit may be a central processing unit (English: Central Processing Unit, CPU for short), a network processor (English: Network Processor, NP for short), or the like.

The communication interface 43 is configured to communicate with an external device, and the communication interface 43 is controlled by the processor 41.

The memory 42 may be configured to store various data, such as various configuration parameters, and a software program and/or an application program module. The software program and/or the application program module may be executed by the processor 41. The memory 42 may mainly include a program storage area and a data storage area. The program storage area may store an operating system 44 and an application program module 45 that is required by at least one function, such as a configuration module 451 and a sending module 452. The data storage area may store data, such as first QoS information and second QoS information, created based on use of the core network control plane device 160, and the like.

Optionally, the processor 41 is configured to execute the modules in the application program module 45, and implement steps that need to be performed by the core network control plane device in FIG. 5, FIG. 6, FIG. 7, FIG. 8, FIG. 9*a*, FIG. 9*b*, FIG. 10, and FIG. 11.

In addition, the memory 42 is a computer readable storage medium, and may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

Figure 5:
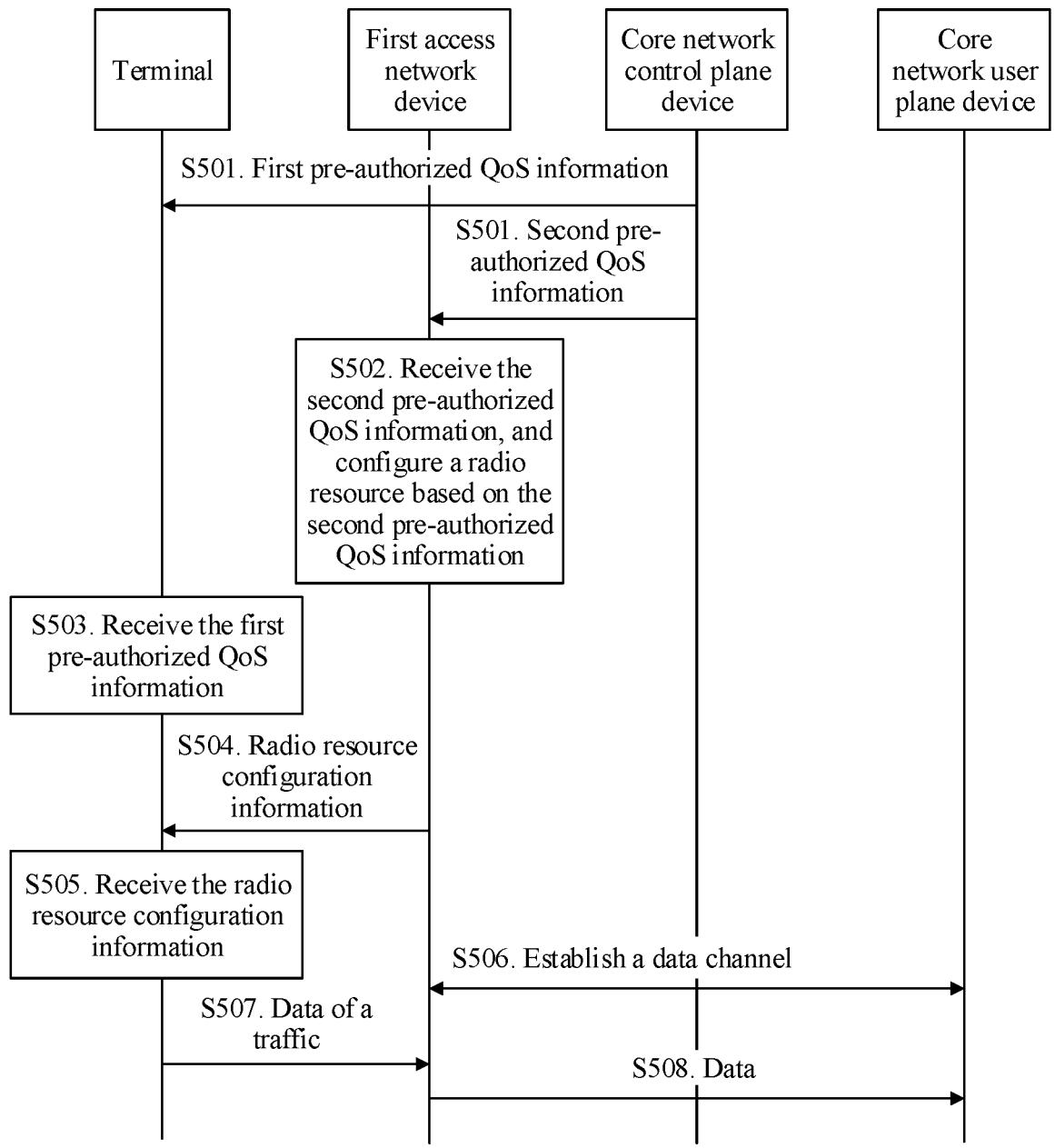
FIG. 5 is a flowchart of a method for communication according to an embodiment of the present invention.

Referring to FIG. 5, FIG. 5 shows a method for communication according to an embodiment of the present invention. The method may be implemented by using the system shown in FIG. 1. The embodiment shown in FIG. 5 is described by using an example in which a radio resource is configured based on pre-authorized QoS information. The method includes the following steps.

S501. A core network control plane device sends first pre-authorized QoS information to a terminal, and sends second pre-authorized QoS information to a first access network device.

The core network control plane device may configure the pre-authorized QoS information (including the first pre-authorized QoS information and the second pre-authorized QoS information) for the terminal based on subscription information (for example, subscription information of the terminal obtained from a home subscriber server (English: Home Subscriber Server, HSS for short)) of the terminal. In addition, the core network control plane device may further configure the pre-authorized QoS information for the terminal based on a common traffic (such as email or Taobao). The two cases may be combined.

In an implementation, the core network control plane device sends the second pre-authorized QoS information to the first access network device by using an access stratum (English: Access Stratum, AS for short) message, and then the first access network device sends the first pre-authorized QoS information to the terminal by using an AS message. In another implementation, the core network control plane device sends the second authorized QoS information to the first access network device by using an AS message, and the core network control plane device sends the first authorized QoS information to the terminal by using a non-access stratum (English: Non-Access Stratum, NAS for short) message, as shown in FIG. 5.

During implementation, the first pre-authorized QoS information and the second pre-authorized QoS information may be sent in a protocol data unit (English: Protocol Data Unit, PDU for short) session establishment process, for example, may be sent by being carried in a session establishment response message. Therefore, the core network control plane device may configure the pre-authorized QoS information for the terminal when receiving a session establishment request message. It should be noted that, the PDU session establishment process may also be referred to as a public data network (English: Public Data Network, PDN for short) connection establishment process. Alternatively, the first pre-authorized QoS information and the second pre-authorized QoS information may also be sent in an initial UE context setup process.

Further, content of the first pre-authorized QoS information and the second pre-authorized QoS information may be the same or different. When the first pre-authorized QoS information is different from the second pre-authorized QoS information, the first pre-authorized QoS information may be a part of the second pre-authorized QoS information, or the first pre-authorized QoS information and the second pre-authorized QoS information partially overlap.

Specifically, the first pre-authorized QoS information includes at least one QoS parameter identifier, and each QoS parameter identifier may be used as an index and be corresponding to a QoS parameter of a data packet group (namely, an index of the QoS parameter corresponding to the data packet group). During implementation, in one manner, a correspondence between a QoS parameter identifier and a QoS parameter is defined in a standard. To be specific, a plurality of sets of QoS parameters (for example, each set of QoS parameters may include a priority, a latency, and a packet loss rate) are defined in the standard, a serial number is assigned to each set of QoS parameters, and the serial number may be used as the QoS parameter identifier. For example, a QoS parameter identifier 1 is corresponding to a first set of QoS parameters in the standard. In another manner, the correspondence between a QoS parameter identifier and a QoS parameter is configured by the core network control plane device, the QoS parameter identifier is used as an index and is corresponding to a set of several QoS parameters (for example, a QoS parameter identifier 2 is corresponding to a set of parameters such as a priority, a latency, a packet loss rate, and a guaranteed bit rate that are configured on a core network). The two correspondences may be used individually or may coexist.

Optionally, the first pre-authorized QoS information may further include: identification information of network slice (English: slice) of a data packet group, where the identification information of the slice includes at least one of the following: a slice ID, a slice type, a tenant type, a tenant identifier, a network function identifier, and the like.

In a first implementation, the first pre-authorized QoS information further includes a packet filter, and each packet filter is corresponding to a QoS parameter identifier. The packet filter may be configured to filter a data packet based on IP 5-tuple information or based on a source address and a destination address, to obtain a data packet group. The IP 5-tuple information is for an IP data packet, and may include one or more of a source IP address, a destination IP address, a source port, a destination port, and a protocol number. The source address and the destination address are for a non-IP data packet (such as an Ethernet (English: Ethernet) frame). For example, a group of IP data packets may be obtained through filtering by using an IP 5-tuple packet filter. For another example, a group of Ethernet frames may be obtained through filtering by using a packet filter of at least one of a source address and a destination address of an Ethernet frame.

In a second implementation, the first pre-authorized QoS information further includes a correspondence between a QoS parameter identifier and application layer information. The application layer information may be information such as an application program ID of an application layer, so that the terminal may group a data packet by using the application layer information, and match the data packet to a QoS parameter identifier.

Further, the first pre-authorized QoS information may include one or more sets of QoS information, where each set of QoS information includes a QoS parameter identifier of a data packet group and other corresponding information (such as application layer information of the traffic, or a packet filter, or a QoS parameter). The first pre-authorized QoS information includes a plurality of sets of QoS information, so that QoS information corresponding to a plurality of data packet groups may be sent to the terminal in one time. Network signaling overheads can be reduced compared with the prior art in which a terminal requests to establish a dedicated bearer, and a QoS parameter is configured for one data packet group each time based on a request of the terminal, and is sent to the terminal.

The second pre-authorized QoS information may include content of the first pre-authorized QoS information; or include a part of content of the first pre-authorized QoS information. For example, the first pre-authorized QoS information includes a QoS parameter identifier and a corresponding packet filter (namely, the first implementation of the first pre-authorized QoS information), and the second pre-authorized QoS information includes only a QoS parameter identifier but not a packet filter.

It should be noted that, when the correspondence between a QoS parameter identifier and a QoS parameter is defined by the standard, the correspondence may be pre-configured by an access network device; therefore, the second pre-authorized QoS information may include a QoS parameter corresponding to a data packet group, or may not include a QoS parameter corresponding to a data packet group. When the correspondence between a QoS parameter identifier and a QoS parameter is configured by the core network control plane device for the terminal, the second pre-authorized QoS information needs to include the QoS parameter corresponding to the QoS parameter identifier.

Specifically, the QoS parameter may include one or more of a priority, a packet loss rate, a latency, a guaranteed bit rate (English: Guaranteed Bit Rate, GBR for short), a maximum rate, a requested rate, a drop precedence of a single data packet, a priority of a single data packet, a session rate, and an allocation and retention priority (English: Allocation and Retention Priority, ARP for short). The guaranteed bit rate is a rate that the data packet group needs a network to guarantee. The maximum rate is a maximum transmission rate of the data packet group. The requested rate is a rate that a non (English: non)-GBR traffic requests the network to provide, and is generally a rate required by the data packet group for meeting the traffic. The session rate is a maximum value of a sum of rates provided for all non-guaranteed bit rate data packet groups in a PDU session. The allocation and retention priority indicates a level of preempting and being preempted of a data packet group.

Further, during implementation, for a guaranteed bit rate traffic, the QoS parameter usually includes at least a priority, a packet loss rate, a latency, and a guaranteed bit rate. For a non-guaranteed bit rate traffic, the QoS parameter usually includes at least a priority, a packet loss rate, and a latency.

Optionally, the second pre-authorized QoS information may further include aggregated QoS information, where the aggregated QoS information is used to indicate an overall QoS requirement of a plurality of data packet groups. For example, the second pre-authorized QoS information may further include a maximum aggregate rate of a plurality of data packet groups, where the maximum aggregate rate indicates a maximum transmission rate of the plurality of data packet groups. During implementation, the plurality of data packet groups may belong to a same traffic, and further, the traffic may be a non-guaranteed bit rate traffic. Alternatively, the plurality of data packet groups may belong to a same network slice (English: slice). Further, a maximum aggregate rate of the plurality of data packet groups may be a maximum aggregate rate of data packet groups of all non-GBR traffics of the slice, for example, a network slice-aggregate maximum bit rate (English: slice-Aggregate Maximum Bit Rate, slice-AMBR for short). The network slice is a logical network function combination that supports a communication service requirement in a particular case. The network slice uses a logical resource rather than a physical resource, and helps an operator provide a service-based network architecture.

In a subsequent data packet transmission process of the data packet group, the first access network device performs rate control based on the aggregated QoS information, so that an overall maximum rate of the data packet group does not exceed a maximum aggregate rate of the aggregated QoS information. For example, rate control is performed by using uplink or downlink scheduling processing.

Further, optionally, the second pre-authorized QoS information may further include first indication information, where the first indication information is used to indicate whether the first access network device pre-configures a radio resource for a corresponding data packet group after receiving the second pre-authorized QoS information. Pre-configuring a radio resource is immediately configuring a radio resource after the pre-authorized QoS information is received.

In an implementation, the first indication information may be separately configured based on each data packet group, for example, indicates that a radio resource needs to be pre-configured for a data packet group 1 and a radio resource does not need to be pre-configured for a data packet group 2. Alternatively, the first indication information may be set based on a QoS parameter of a data packet group. Specifically, the first indication information may be set based on a QoS parameter such as a category, a priority, or a latency. For example, whether a radio resource needs to be pre-configured is set separately based on a GBR traffic and a non-GBR traffic (category). Alternatively, the first indication information indicates that a radio resource needs to be pre-configured for a data packet group with a high priority (priority), or indicates that a radio resource needs to be pre-configured for a data packet group that has a strict requirement on a data latency (for example, a latency value is less than a specified value) (latency).

Further, for a data packet group for which a radio resource needs to be pre-established, the first indication information may further indicate a priority of a pre-established radio resource, and the access network device may selectively establish a radio resource for the data packet group depending on a network status. For example, when network load is relatively high, a radio resource may be established for only a data packet group with a high priority, and when network load is relatively low, a radio resource may also be established for a data packet group with a low priority.

Therefore, a radio resource may be flexibly established for a data packet group with pre-authorized QoS. The priority of the pre-established radio resource may be set based on one or more of QoS parameters of the data packet group, for example, may be set based on one or more of the QoS parameters such as the category, the priority, and the latency.

During implementation, the first indication information may indicate only a data packet group for which a radio resource needs to be pre-configured, and if there is no explicit indication of a data packet group for which a radio resource needs to be pre-configured, the first access network device may not need to immediately establish a radio resource by default.

An effective range of the first indication information may be an uplink traffic, a downlink traffic, or uplink and downlink traffics. For example, if the effective range of the first indication information is an uplink traffic, an uplink radio resource is pre-configured for the data packet group, but a downlink radio resource is not pre-configured.

In another implementation, one or more data packet groups for which radio resources need to be pre-configured or one or more data packet groups for which no radio resource needs to be pre-configured may be determined through network negotiation or protocol agreement. In this case, the pre-authorized QoS information may not include the first indication information. Further, it may be considered by default that a radio resource needs to be pre-configured for all pre-authorized QoS information, or it may be considered by default that no radio resource needs to be pre-configured for all pre-authorized QoS information.

Optionally, if a data channel needs to be established for data between the first access network device and a core network user plane device, the pre-authorized QoS information may further include second indication information, where the second indication information is used to indicate whether to establish a data channel, namely, establish a ground side channel between the first access network device and the core network user plane device. The data channel may be a bearer or a tunnel.

Further, if no data channel needs to be established for the data between the first access network device and the core network user plane device or a data channel needs to be established only for each terminal or each PDU session, for example, a data channel has been established for the terminal or the PDU session of the terminal between the first access network device and the core network user plane device, the second pre-authorized QoS information does not need to include the second indication information.

During implementation, the first indication information and the second indication information may be the same indication information. To be specific, the indication information simultaneously indicates whether to establish a radio bearer and a ground side bearer or a data channel.

Further, the second pre-authorized QoS information may further include validation range information, where the validation range information is used to indicate a geographic area in which the second pre-authorized QoS information is effective, and the geographic area may be represented by using a location area list and/or a routing area list.

S502. The first access network device receives the second pre-authorized QoS information, and configures a radio resource based on the second pre-authorized QoS information.

In this embodiment, configuring a radio resource is allocating a radio resource for air interface transmission of a data packet, to perform uplink data transmission, and may include establishment of a radio bearer (English: Radio Bearer, RB for short) and a mapping relationship between a radio bearer and a data packet group (applicable to a case in which a radio bearer needs to be established for a data packet group), or may include only configuration of a mapping relationship between a data packet group and a radio bearer (applicable to a case in which a data packet group has been mapped to an existing radio bearer). The radio bearer is used for air interface data transmission, and the terminal may send the data packet group on a corresponding radio bearer based on the mapping relationship between a data packet group and a radio bearer. Further, the access network device may determine, according to a radio resource management (English: Radio Resource Management, RRM for short) policy, to establish a new radio bearer for a data packet group corresponding to the QoS parameter or map the data packet group to an existing radio bearer.

Establishing a radio bearer includes establishing or modifying a radio bearer at an air interface, where a protocol stack corresponding to the RB includes a Packet Data Convergence Protocol (English: Packet Data Convergence Protocol, PDCP for short), a Radio Link Control Protocol (English: Radio Link Control Protocol, RLC for short), and a logical channel (English: Logical Channel, LCH for short) parameter configuration. The first access network device configures a related parameter for each layer of the protocol stack, to indicate a transmission characteristic of the radio bearer (English: Radio Bearer, RB for short), and adapt to the QoS parameter.

Further, in a process of configuring a radio resource, the first access network device may consider one or both of identification information of the slice and session information of the data packet group. For example, the first access network device maps data packet groups that belong to different slices to different radio bearers, or may map data packet groups that belong to different sessions to different radio bearers.

Further, the access network device may configure a binding relationship between a data packet group and a radio bearer, and a same radio bearer may be bound to data packet groups of a same PDU session.

Radio bearer configuration information includes a PDCP parameter configuration, an RLC parameter configuration, and an LCH parameter configuration.

The PDCP parameter configuration may include one or more of a discard timer (English: discardTimer), header suppression, a reordering timer, an SN length, and the like.

The RLC parameter configuration may include one or more of an uplink/downlink RLC mode, a poll retransmission timer, a status prohibit timer (English: t-StatusProhibit), a poll PDU, a poll byte, a maximum quantity of retransmissions, a reordering timer (English: t-Reordering), an SN length, and the like.

The logical channel parameter configuration of a MAC layer may include one or more of a priority (English: priority), a nominal rate (English: prioritised bit rate), a bucket size duration (English: bucket size duration), a home logical channel group (English: logical channel group), and the like.

The mapping relationship between a data packet group and a radio bearer may be any one of the following relationships: a mapping relationship between a data packet group identifier and an RB (such as a mapping relationship between the foregoing QoS parameter identifier and an RB), a mapping relationship between a packet filter and an RB, a mapping relationship between a data packet group priority and an RB (data groups of different priorities are mapped to different RBs), or a mapping relationship between a traffic category corresponding to a data packet group and an RB. The mapping relationship between a traffic category corresponding to a data packet group and an RB includes but is not limited to: mapping a GBR data packet group and a non-GBR data packet group to different RBs, or mapping all non-GBR data packet groups to a specified RB, or mapping non-GBR traffic data packet groups of a same PDU session to a same RB (for example, the mapping relationship may be a mapping relationship between an APN of a non-GBR traffic data packet group and a DRB ID, or a mapping relationship between an IP address of a non-GBR traffic data packet group and a DRB ID, or a mapping relationship between a tunnel ID of a non-GBR traffic data packet group and a DRB ID). Alternatively, the mapping relationship between a data packet group and a radio bearer may be further a combination of at least two of the foregoing mapping relationships, for example, data packet groups obtained by combining a packet filter and a priority are mapped to an RB.

In addition, in a process of configuring a radio resource, the first access network device may further consider one or both of the identification information of the slice and the session information of the data packet group. For example, the first access network device maps data packet groups that belong to different slices to different radio bearers, and may further map data packet groups that belong to different sessions to different radio bearers. Therefore, correspondingly, the mapping relationship between a data packet group and a radio bearer may further include a mapping relationship between a session and a radio bearer or a mapping relationship between a slice and a radio bearer.

It should be noted that, if the first access network device maps the data packet group to an existing radio bearer, in step S502, only the mapping relationship between a radio bearer and a data packet group needs to be established, and no radio bearer needs to be established or modified.

For a downlink traffic, the first access network device configures a mapping relationship between a data packet group and an RB.

Specifically, step S502 may include:

when the second pre-authorized QoS information includes the first indication information, and the first indication information indicates that a radio resource needs to be pre-configured for the corresponding data packet group, immediately configuring a radio resource for the corresponding data packet group based on a QoS parameter in the second pre-authorized QoS information; or when the second pre-authorized QoS information includes the first indication information, and the first indication information indicates that no radio resource needs to be pre-configured for the corresponding data packet group, or the second pre-authorized QoS information does not include the first indication information indicating that a radio resource needs to be pre-configured for the corresponding data packet group, configuring a radio resource for the data packet group when the terminal initiates the traffic (for example, sends a traffic request).

S503. The terminal receives the first pre-authorized QoS information.

After receiving the first pre-authorized QoS information, the terminal stores the first pre-authorized QoS information, so that when the traffic is subsequently initiated, traffic data is sent based on the first pre-authorized QoS information. Therefore, step S503 is performed before the terminal initiates the traffic, namely, is performed before the terminal sends a traffic request.

Optionally, the core network control plane device may update the pre-authorized QoS information by using an area update procedure such as a location area update and/or a routing area update, to update some or all information in the pre-authorized QoS information (including at least one of the first pre-authorized QoS information and the second pre-authorized QoS information). The terminal and the first access network device receive updated pre-authorized QoS information, and update the locally stored pre-authorized QoS information.

S504. The first access network device sends radio resource configuration information to the terminal.

The radio resource configuration information includes the radio bearer configuration information and the mapping relationship between a data packet group and a radio bearer; or the radio resource configuration information includes the mapping relationship between a data packet group and a radio bearer.

Optionally, the radio resource configuration information may further include data transmission manner configuration information of a data packet. A data transmission manner includes a base station scheduling manner and a terminal contention manner. When the data transmission manner is the terminal contention manner, the radio resource configuration information further includes a contention resource configuration, such as a contention common channel configuration or a contention rule configuration. The common channel configuration may be a channel resource configuration, for example, one or both of a configuration of different protocol layers corresponding to a common channel and configuration information of a time-frequency domain resource corresponding to the common channel. A contention rule may include one or more rules of performing contention by the terminal, performing contention again after a random time following contention backoff, and the like.

S505. The terminal receives the radio resource configuration information.

The terminal receives and stores the radio resource configuration information, so that the terminal subsequently sends the data of the traffic by using a corresponding radio resource.

It should be noted that, there is no sequence between step S503 and step S505.

S506. The first access network device establishes a data channel between the first access network device and a core network user plane device.

Specifically, the first access network device and the core network control plane device exchanges data channel establishment information, to establish the data channel. During implementation, the data channel between the first access network device and the core network user plane device may be established in a PDU session establishment process.

It should be noted that, when the second pre-authorized QoS information includes the second indication information, and the second indication information indicates that a data channel needs to be pre-established for the data packet group, step S506 needs to be immediately performed after the first access network device receives the second pre-authorized QoS information.

The data channel may be established in a manner that each PDU session is corresponding to one data channel, that is, each PDU session is uniquely corresponding to one data channel, or may be established in a manner that each terminal is corresponding to one data channel, that is, each terminal is uniquely corresponding to one data channel.

The first access network device stores a correspondence between an RB and a data channel, and the core network user plane device stores a mapping relationship between a data channel and a packet filter.

S507. When initiating a traffic, the terminal sends data of the traffic based on the first pre-authorized QoS information.

Specifically, step S507 may include:

when the terminal has data of the traffic to be sent, filtering the data of the traffic by using a packet filter; and sending a selected data packet to the access network device by using a corresponding radio bearer based on the mapping relationship, in the radio resource configuration information, between a data packet group and a radio bearer.

In an implementation, the corresponding radio bearer may be directly determined based on the mapping relationship between a data packet group and a radio bearer, for example, when the mapping relationship between a data packet group and a radio bearer is a mapping relationship between a data packet group identifier and a radio bearer.

In another implementation, the corresponding radio bearer needs to be indirectly determined based on the mapping relationship between a data packet group and a radio bearer, for example, the radio resource configuration information carries a mapping relationship between a QoS parameter and a radio bearer (for example, a mapping relationship between a data packet group priority and an RB, or a mapping relationship between a latency of a data packet group and an RB). In this case, the sending a selected data packet to the access network device by using a corresponding radio bearer based on the correspondence, in the radio resource configuration information, between a data packet group and a radio bearer includes:

determining, based on a packet filter passed by the selected data packet, a QoS parameter identifier corresponding to the packet filter; obtaining a QoS parameter corresponding to the QoS parameter identifier; and determining, based on the obtained QoS parameter, a radio bearer corresponding to the data packet group.

Alternatively, step S507 may include:

determining a radio bearer corresponding to the traffic; and sending the data of the traffic to the first access network device by using the determined radio bearer. The radio bearer corresponding to the traffic is determined based on the correspondence, in the radio resource configuration information, between a data packet group and a radio bearer.

Optionally, when the radio resource configuration information further includes a data transmission manner, sending the data packet to the first access network device may include:

when the data transmission manner of the terminal is the base station scheduling manner, selecting, by the terminal based on the mapping relationship between a data packet group and an RB, an RB corresponding to the data packet group, and sending the data packet to the first access network device on the RB; or when the data transmission manner of the terminal is the contention manner, performing, by the terminal, contention on a common channel, and sending the data on a corresponding resource if the contention succeeds.

During implementation, the data packet group that passes the packet filter may be referred to as a flow (English: flow). Therefore, the foregoing mapping relationship between a data packet group and an RB may be further referred to as a mapping relationship between a flow and an RB.

S508. The first access network device receives the data sent by the terminal, and forwards the data to the core network user plane device.

Specifically, the access network device sends the received data packet to the core network user plane device through the data channel between the access network device and the core network user plane device. The data channel between the access network device and the core network user plane device may be established in the PDU session establishment process.

Specifically, step S508 includes: sending, by the first access network device, the data packet to the core network user plane device through a corresponding data channel.

Further, when the data channel is established in a manner that each PDU session is corresponding to one data channel, step S508 is implemented in the following manner:

obtaining, by the access network device, PDU session information corresponding to the data packet; and sending the data packet to the core network user plane device by using a data channel corresponding to the PDU session information.

Specifically, the obtaining, by the access network device, PDU session information corresponding to the data packet may be implemented in the following manner:

when the second pre-authorized QoS information is notified by the core network control plane device to the access network device or authorized QoS information is notified by the core network control plane device to the access network device includes session information, the PDU session information corresponding to the data packet may be obtained from the second pre-authorized QoS information or the authorized QoS information.

Further, the second pre-authorized QoS information or the authorized QoS information may explicitly or implicitly include the PDU session information. For example, the second pre-authorized QoS information in the session establishment process may implicitly include the session information, and specific session information is associated based on different session establishment processes. When the core network control plane device notifies the access network device of the authorized QoS, the session information may be explicitly carried in the QoS information.

The access network device may filter the data packet, to obtain a QoS parameter corresponding to the data packet, and obtain the session information based on the QoS parameter. Therefore, the data packet is mapped to the corresponding data channel, and a routing operation is implemented. In the session establishment process, a data channel of a session is established between the access network device and the core network user plane device, and is used for data transmission of the PDU session on a ground side.

For example, a data packet group 1 belongs to a session 1, and a data packet group 2 belongs to a session 2. The access network device receives several uplink data packets, filters the data packets by using a packet filter 1 of the data packet group 1 to obtain a data packet of the data packet group 1, and delivers the data packet of the data packet group 1 to a data channel 1 corresponding to the session 1, to implement routing; filters the data packets by using a packet filter 2 of the data packet 2 to obtain a data packet of the data packet group 2, and delivers the data packet of the data packet group 2 to a data channel 2 corresponding to the session 2, to implement routing. Further, the access network device may combine packet filters of all data packet groups of the session 1, to obtain a packet filter group of the session 1, and the access network device delivers, to the data channel 1 corresponding to the session 1, a data packet that is obtained through filtering by using the packet filter group of the session 1, to implement routing.

Further, if a same radio bearer is bound only to data packet groups of a same session, namely, if several data packet groups of the session 1 are mapped to a same radio bearer, the access network device delivers an uplink data packet of the radio bearer to the data channel 1 corresponding to the session 1, to implement routing without a packet filtering operation.

In addition, for a downlink traffic, the first access network device configures the mapping relationship between a data packet group and an RB. When sending downlink data, the first access network device selects an RB corresponding to the data packet group by using the mapping relationship between a data packet group and an RB, and sends the data to the terminal by using the selected RB.

In this embodiment, before the terminal initiates the traffic, the pre-authorized QoS information (including the first pre-authorized QoS information and the second pre-authorized QoS information) is allocated to the terminal, and the pre-authorized QoS information is sent to the terminal and the access network device. Therefore, when the terminal initiates the traffic, the access network device may configure a radio resource for the terminal without waiting for authorized QoS information from a core network device, and the terminal may send the data of the traffic by using the configured radio resource, so that a traffic start time of the terminal can be shortened, and signaling overheads on a core network side can be reduced. In addition, if the access network device immediately configures a radio resource for the terminal after obtaining the pre-authorized QoS information, the terminal may enter a linked state before sending the data packet. A radio bearer and/or a ground side data channel are/is established, and when the terminal needs to send uplink data, the terminal may directly send the data on the pre-established radio bearer, thereby further increasing a data transmission start speed and improving user experience.

Figure 6:
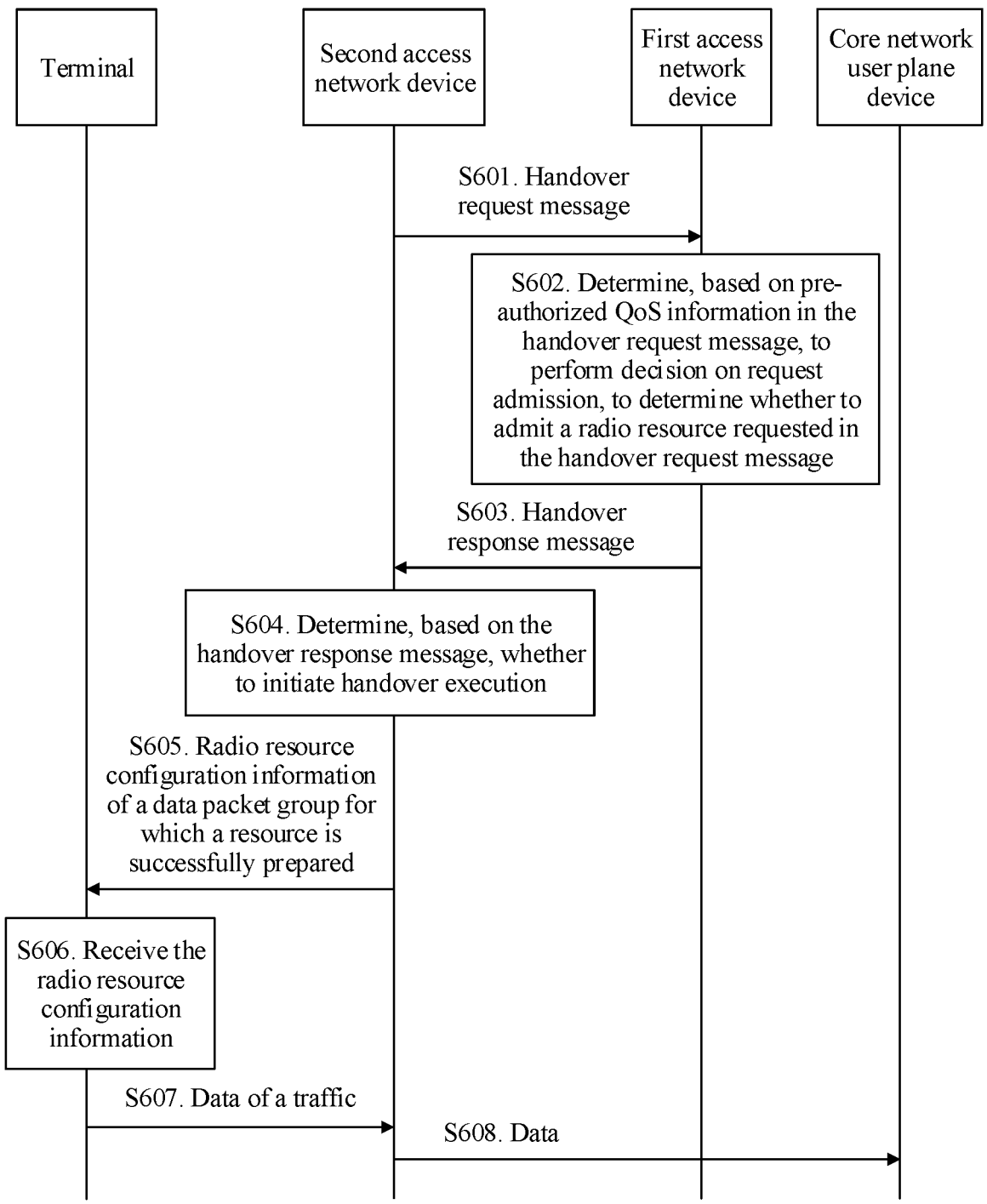
FIG. 6 is a flowchart of another method for communication according to an embodiment of the present invention.

Referring to FIG. 6, FIG. 6 shows a method for communication according to an embodiment of the present invention. The method is implemented by using the system shown in FIG. 1. In the embodiment shown in FIG. 6, this embodiment of the present invention is described in detail by using an example in which a radio resource is configured based on pre-authorized QoS information in a handover process. The method includes the following steps.

S601. A second access network device sends a handover request message to a first access network device.

The second access network device may also be referred to as a source-side access network device, and the first access network device may also be referred to as a target-side access network device. A handover process message between the first access network device and the second access network device may be sent and received through a direct interface between the first access network device and the second access network device (a handover process between peer entities), or may be forwarded by a third party, for example, by a core network control plane device (a handover process performed by using a core network).

The handover request message includes pre-authorized QoS information. The pre-authorized QoS information in the handover request message may include a part or all of the second pre-authorized QoS information in the embodiment shown in FIG. 5, for example, may include only the QoS parameter identifier in step S501 and a QoS parameter corresponding to the QoS parameter identifier; or may include the QoS parameter identifier, the QoS parameter corresponding to the QoS parameter identifier, and the packet filter corresponding to the QoS parameter; or may further include the first indication information.

During implementation, the core network control plane device may update the pre-authorized QoS information by using a handover process, for example, update some or all information in the pre-authorized QoS information by using the handover request message, and send updated pre-authorized QoS information to the target-side access network device and/or a terminal. The terminal and the target-side access network device receive the updated pre-authorized QoS information, and update the locally stored pre-authorized QoS information. The terminal obtains the updated pre-authorized QoS information by using an air interface message in the handover process.

Further, the handover request message may further include third indication information, where the third indication information is used to indicate whether a radio bearer has been established for a data packet group on a source side.

In an implementation, the third indication information may be an explicit indication for each data packet group, for example, attribute information carrying one QoS parameter, where the attribute information is used to indicate whether a radio resource has been configured for a data packet group, namely, whether a correspondence between a data packet group and a radio bearer has been established on the source side. In this implementation, the handover request message may further include data transmission indication information, where the data transmission indication information is used to indicate whether data of the data packet group for which a radio resource has been configured on the source side has been transmitted or is being transmitted.

In another implementation, the third indication information may be an implicit indication. For example, if the handover request message carries a correspondence between a data packet group and a radio bearer, it indicates that a radio resource has been configured on the source side for the data packet group corresponding to the set of QoS parameters, or if the handover request message does not carry the correspondence between a data packet group and a radio bearer, it indicates that no radio resource has been configured on the source side for the data packet group corresponding to the set of QoS parameters. In this implementation, the handover request message may further include data transmission indication information, where the data transmission indication information is used to indicate whether data of the data packet group for which a radio resource has been configured on the source side has been transmitted or is being transmitted.

In another implementation, the handover request message may not include the third indication information or the data transmission indication information, but another message in the handover process is used to carry the third indication information and the data transmission indication information. For example, a message that is sent by the source-side access network device to the target-side access network device and that carries a serial number status report (English: Serial Number status report, SN status report for short) may carry only an SN status of a data packet group for which the mapping relationship between a data packet group and a radio bearer has been established, where the SN status is an uplink/downlink (English: uplink/downlink) PDCP SN and hyper frame number (English: Hyper Frame Number, HFN for short) status. A target side receives the message that carries the SN status report, and can a specific data packet group for which a radio bearer has been established. If a PDCP SN and an HFN of the data packet group are both 0, it indicates that no data is being transmitted. In other words, the PDCP SN and the HFN are used as implicit third indication information and data transmission indication information.

S602. The first access network device receives the handover request message, and determines, based on pre-authorized QoS information in the handover request message, to perform judgment on request admission, to determine whether to admit a radio resource requested in the handover request message.

Admitting the radio resource requested in the handover request message is configuring the radio resource for the terminal based on the radio resource requested in the handover request message. Refer to step 502 for specific implementation of configuring the radio resource, and detailed description is omitted herein.

Specifically, the first access network device may use one or more pieces of the following information as an input of an admission judgment algorithm, to perform judgment on request admission:

a QoS parameter corresponding to each data packet group in the pre-authorized QoS information, whether a radio resource has been configured for a data packet group corresponding to the QoS parameter, whether data of the data packet group corresponding to the QoS parameter has been sent, and whether the data of the data packet group corresponding to the QoS parameter is being transmitted.

For example, when performing admission judgment, the first access network device may consider only the data packet group for which a radio resource has been configured, and determine, based on the QoS parameter of the data packet group and a resource status of the target side, whether to admit the data packet group for which a radio bearer has been established on the source side. For another example, when the target side is short of network resources, only a resource request of a data packet group with data to be sent may be considered.

S603. The first access network device sends a handover response message to the second access network device, where the handover response message may be a handover preparation failure message or a handover preparation success message.

Specifically, when determining that none of resources requested in the handover request message is admitted, the first access network device sends the handover preparation failure message, where the handover preparation failure message is used to indicate that none of the resources requested in the handover request message is admitted; or when determining that all or some resources requested in the handover request message are admitted, the first access network device sends a handover preparation success message. That some of the resources requested in the handover request message are not admitted may include that some data packet groups in the pre-authorized QoS information for which radio bearers need to be pre-established are not admitted by the first access network device.

Further, the handover preparation failure message may further carry a handover failure cause. A failure cause may be provided for each data packet group of the handover request. The failure cause includes but is not limited to: there is no available radio resource, pre-establishment of a radio bearer with pre-authorized QoS is not supported, a QoS parameter is not supported, a geographic area is not supported, and the like. That a geographic area is not supported is that the traffic is not supported in a target cell of the target access network device, for example, some traffics are effective only in a particular geographic area. That a QoS parameter is not supported is that a traffic corresponding to the QoS parameter cannot be supported in the target access network device.

Further, the handover preparation success message may further carry a handover failure cause. Still further, a failure cause may be provided for each data packet group for which a resource is unsuccessfully prepared. For example, a list is carried, where the list includes an identifier of a data packet group for which a resource is unsuccessfully prepared and a corresponding failure cause. The failure cause includes but is not limited to: there is no available radio resource, pre-establishment of a radio bearer with pre-authorized QoS is not supported, a QoS parameter is not supported, a geographic area is not supported, and the like. That a geographic area is not supported is that the traffic is not supported in a target cell of the target access network device, for example, some traffics are effective only in a particular geographic area. That a QoS parameter is not supported is that a traffic corresponding to the QoS parameter cannot be supported in the target access network device.

In addition, the handover preparation success message further includes related resource configuration information of a data packet group for which a resource is successfully prepared.

S604. The second access network device receives the handover response message, and determines, based on the handover response message, whether to initiate handover execution.

Specifically, if the second access network device receives the handover preparation success message, the second access network device may initiate handover execution, and hand the terminal over to a target cell, where the target cell is a cell provided by the first access network device.

Further, the second access network device may determine, based on a status of an admitted resource that is requested by the source side, not to initiate handover execution. For example, the target side admits only resource requests of some traffics, and the source side determines not to initiate handover execution. Alternatively, the source side may determine, based on a type of a traffic received by the target side, such as an authorized service or a pre-authorized service, whether to initiate a handover.

S605. When the second access network device determines to initiate handover execution, the second access network device sends, to the terminal, radio resource configuration information that is sent by the first access network device and that is of a data packet group for which a resource is successfully prepared.

Refer to step S504 for specific content of the radio resource configuration information, and detailed description is omitted herein.

S606. The terminal receives the radio resource configuration information.

In step S606, the terminal receives and stores the radio resource configuration information.

S607. When initiating a traffic, the terminal sends data of the traffic to the first access network device based on first pre-authorized QoS information by using a radio resource configured by the first access network device.

Refer to step S507 for a specific implementation process of step S607, and detailed description is omitted herein.

S608. The first access network device receives the data sent by the terminal, and sends the data to a core network user plane device.

Refer to step S508 for an implementation process of step S608, and detailed description is omitted herein.

This embodiment is described by using an example in which the terminal is handed over between access network devices in a radio access network. When the terminal is handed over between radio access networks, a handover request message sent by the source-side access network device may carry only QoS information for requiring the access network device to establish a radio resource. After receiving the handover request message, the target-side performs admission decision on the QoS information included in the handover request message, and if the target-side succeeds or partially succeeds in admission, the target-side returns a handover preparation success message, or otherwise, returns a handover preparation failure message.

In this embodiment, the source-side access network device may determine, based on the handover preparation success message of the target-side access network device, whether to initiate a handover, and hand the terminal over to the target-side access network device, so that mobility performance of the terminal can be ensured. The target-side access network device configures a radio resource for the terminal in the handover process based on pre-authorized QoS. After the terminal is handed over to the target-side access network device, and when the data of the terminal arrives, the terminal may directly send the data on the configured radio resource, thereby increasing a data transmission start speed, and improving user experience.

Figure 7:
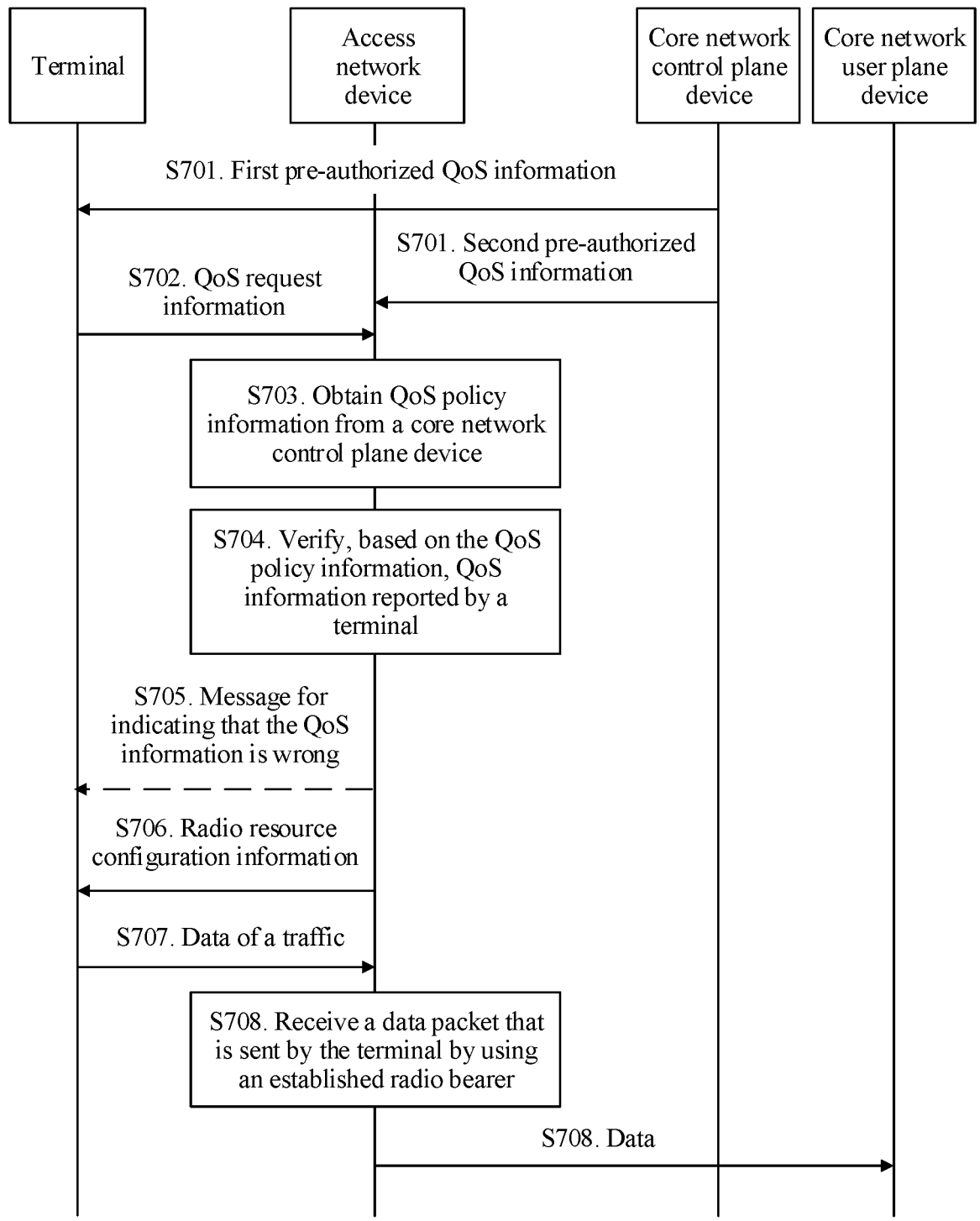
FIG. 7 is a flowchart of another method for communication according to an embodiment of the present invention.

Referring to FIG. 7, FIG. 7 shows another method for communication according to an embodiment of the present invention. The method is implemented by using the system shown in FIG. 1. In the embodiment shown in FIG. 7, the method includes the following steps.

S701. A core network control plane device sends first pre-authorized QoS information to a terminal, and sends second pre-authorized QoS information to an access network device.

Refer to S501 for a specific implementation process, and detailed description is omitted herein.

S702. When initiating a traffic, the terminal sends QoS request information to the access network device.

Specifically, the terminal may send the QoS request information to the access network device by using control plane signaling, for example, by using an SRB message; or the terminal may send the QoS request information to the access network device in a user plane manner.

When the terminal sends the QoS request information to the access network device in the user plane manner, a form of a Media Access Control-control element (English: Media Access Control-Control Element, MAC-CE for short) may be used, or an uplink data packet is sent on a default bearer, and new data indication information is carried in a data packet header. The new data indication information is used to indicate that the data packet is a new data packet, and indicate QoS information of the data packet group. The QoS information of the data packet group may be a QoS parameter identifier.

Further, the new data indication information may be set in the following manner: One bit is set in a PDCP layer data packet header, and is used to indicate whether the data is new data. For example, when a value of the bit is set to 1, it indicates that the data is new data, and when the value is set to 0, it indicates that the data is not new data.

The new data packet means that the access network device does not configure a corresponding RB for the data packet group. Correspondingly, after receiving the new data packet, the access network device configures an RB for the data packet group.

Specifically, the QoS request information may include part or all content of corresponding QoS information of the data packet group whose transmission is requested in the first pre-authorized QoS information. For example, if the corresponding QoS information in the first pre-authorized QoS information received by the terminal does not include a QoS parameter, the QoS request information includes only a data packet group identifier, or otherwise, may include a data packet group identifier and a corresponding QoS parameter, or include only a QoS parameter corresponding to the data packet group. Alternatively, the QoS request information may include reflective characteristic information, where the reflective characteristic information may include a downlink QoS parameter of the traffic and indication information that is used to indicate a capability of obtaining an uplink QoS parameter based on the downlink QoS parameter of the traffic. Optionally, the reflective characteristic information may further include an uplink RB configuration of the traffic. Further, optionally, the reflective characteristic information may further include identification information of slice of the traffic, and the identification information of the slice includes at least one of the following: a slice ID, a slice type, a tenant type, a tenant identifier, a network function identifier, and the like.

Optionally, the QoS request information may further include indication information that is used to indicate a QoS information obtaining type, where the obtaining type may be obtaining the QoS information from the first pre-authorized QoS information (for example, obtaining a QoS parameter through mapping by using a packet filter), or may be obtaining the QoS information based on downlink QoS information.

Uplink QoS information obtained based on the downlink QoS information may include an uplink QoS parameter and a corresponding packet filter. The uplink QoS information may be obtained based on information about a downlink data packet. For example, the terminal reverses an IP 5-tuple of a downlink data packet header, that is, reverses a destination address and a source address, to obtain a packet filter of an uplink data packet group. An uplink QoS parameter and a downlink QoS parameter corresponding to the packet filter are the same, or the uplink QoS parameter and the downlink QoS parameter corresponding to the packet filter may also meet another mapping rule, and the core network control plane device may notify the terminal of the mapping rule in advance.

Further, when the indication information indicates that the QoS information obtaining type is obtaining the QoS information based on the downlink QoS information, the QoS request information may further include QoS information of a downlink data packet group or a downlink data packet group identifier, where the QoS information and the downlink data packet group identifier each are corresponding to the uplink QoS information. The downlink data packet group identifier may be one of a bearer identifier, a service identifier, a flow identifier, a channel identifier, a radio bearer identifier, and the like corresponding to the downlink data packet group.

Optionally, the QoS request information may further include PDU session information of the data packet group. The PDU session information may include at least one of the following: an access point name (English: Access Point Name, APN for short); a PDN GW identifier; a PDN GW address (an IP address or a non-IP address); an IP address allocated by a PDN GW to the terminal; a session identifier; and a DN identifier.

Optionally, the QoS request information may further include identification information of slice. The access network device uses identification information of slice of a received data packet group as reference information of a radio resource configuration of the data packet group. For example, independent radio bearers may be configured for data packet groups of different slices.

It should be noted that, step S707 is directly performed without step S702 to step S706 if the access network device has configured a radio bearer for the traffic of the terminal before the terminal initiates the traffic, for example, a radio bearer is pre-established based on the second pre-authorized QoS, or an uplink radio bearer is configured during configuration of a downlink radio bearer.

Correspondingly, the access network device receives the QoS information.

S703. The access network device obtains QoS policy information from the core network control plane device.

The QoS policy information includes pre-authorized QoS information. Further, in a scenario of supporting reflective QoS, the QoS policy information further includes a reflective QoS rule, where the reflective QoS rule is used to indicate a manner of obtaining the uplink QoS information based on the downlink QoS information. The core network control plane device may notify the access network device and the terminal of the reflective QoS rule. For example, the core network control plane device notifies the access network device and the terminal in a PDU session establishment process, or in a UE initial context setup process, or in another signaling interaction process between UE and the core network control plane device. It should be noted that, there is no sequence between step S703 and steps S701 and S702, and the access network device may obtain the QoS policy information after receiving the QoS request information, or obtain the QoS policy information in advance.

Specifically, in a scenario of supporting reflective QoS, the method may further include:

Step 1: When a downlink traffic is established, the core network control plane device notifies the access network device of a downlink QoS parameter of the traffic, and indicates that the traffic has a reflective (English: reflective) characteristic. In other words, an uplink QoS parameter of the traffic can be obtained based on the downlink QoS parameter of the traffic.

Further, the core network control plane device may notify the access network device of the downlink QoS parameter of the traffic in a control plane or user plane manner.

Step 2: The access network device sends reflective characteristic information of the traffic to the terminal.

Specifically, the access network device may notify the terminal of the reflective characteristic information of the traffic in one of the following two manners:

In a first manner, the terminal is notified in a user plane manner.

For example, the reflective characteristic information is carried in a data packet header of a PDCP layer. Alternatively, the reflective characteristic information may be carried in a header of another protocol layer, for example, carried in a header of an RLC layer or a MAC layer.

In a second manner, the terminal is notified in a control plane manner.

For example, the reflective characteristic information is sent to the terminal by using an RRC message, and the message explicitly indicates that the traffic has a reflective characteristic. Alternatively, an implicit manner may be used, and an uplink configuration of the radio bearer is used to indicate that the traffic has a reflective characteristic. To be specific, if the access network device carries the uplink configuration of the radio bearer in the reflective characteristic information, it indicates that the traffic has a reflective characteristic.

In this embodiment, the terminal may obtain the QoS information in two manners, that is, obtain the uplink QoS information based on the first pre-authorized QoS information and based on the downlink QoS information. In this case, the terminal may obtain the QoS information by using information that is obtained latterly. Specifically, if the terminal first receives the first pre-authorized QoS information and then receives the reflective characteristic information, the uplink QoS information includes the QoS information obtained based on the downlink QoS information, or if the terminal first receives the reflective characteristic information and then receives the first pre-authorized QoS information, the uplink QoS information includes at least a part of the first pre-authorized QoS information.

S704. The access network device verifies, based on the QoS policy information, QoS information reported by the terminal. If the verification succeeds, S706 is performed; or otherwise, S705 is performed.

When the uplink QoS information is pre-authorized QoS information, QoS verification is to verify whether a correspondence between a QoS parameter and a data packet filter is correct. When the uplink QoS information is reflective QoS, QoS verification is to verify whether the mapping manner meets the reflective QoS rule.

S705. The access network device sends, to the terminal, a message for indicating that the QoS information is wrong.

The access network device notifies, in step S705, the terminal that the QoS information is wrong, and does not configure a radio resource.

S706. The access network device configures a radio resource for a data packet group, and sends radio resource configuration information to the terminal.

Specifically, the access network device may configure the radio resource for the data packet group based on the uplink QoS information in the QoS request information. Correspondingly, the terminal receives the radio resource configuration information.

Refer to step 502 for a specific implementation process that the access network device configures the radio resource for the data packet group, and details are not described herein.

S707. When initiating a traffic, the terminal sends data of the traffic to the access network device based on the radio resource configuration information by using a radio bearer corresponding to the data packet group.

Refer to step S507 for a specific implementation process of the step 707, and details are not described herein again.

S708. The access network device receives the data that is sent by the terminal by using the established radio bearer, and sends the received data to a core network user plane device.

Refer to step S508 for a specific implementation process of step S708, and details are not described herein again.

In addition, in addition to a manner in step S508 of obtaining, by the access network device, the PDU session information corresponding to the data packet, the PDU session information corresponding to the data packet may also be obtained in the following manner: The QoS request information carries the PDU session information, and the PDU session information corresponding to the data packet is directly obtained from the QoS request information.

In this embodiment, a bearer of a data packet group corresponding to QoS is established by using a QoS request and verification between the terminal and the access network device, so that a new traffic can be fast established between the terminal and the access network device. Compared with an existing traffic establishment procedure, in this embodiment, fast data transmission can be implemented, an uplink data transmission latency can be reduced, and user experience can be improved.

Figure 8:
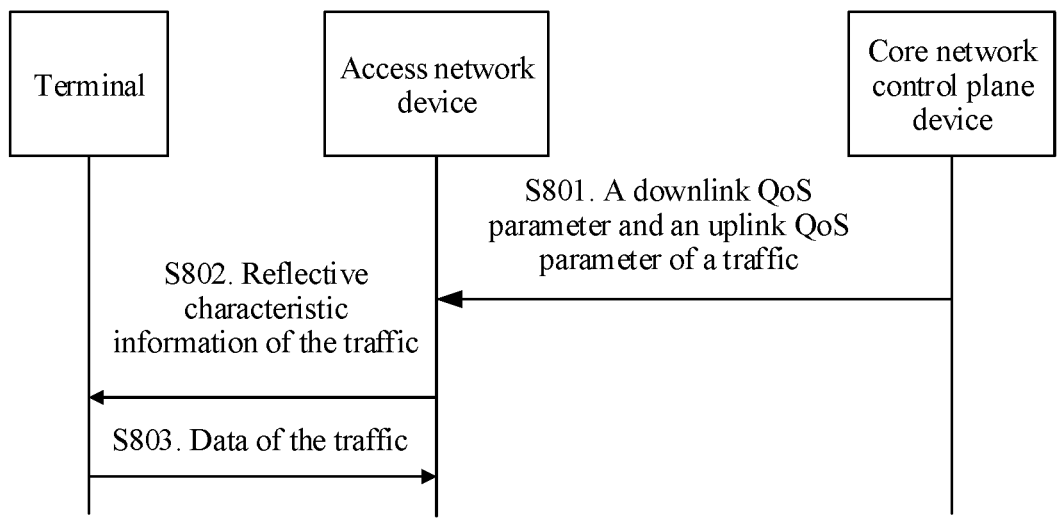
FIG. 8 is a flowchart of another method for communication according to an embodiment of the present invention.

Referring to FIG. 8, FIG. 8 shows another method for communication according to an embodiment of the present invention. The method is implemented by using the system shown in FIG. 1. In the embodiment shown in FIG. 8, the method includes the following steps.

S801. During establishment of a traffic, a core network control plane device sends a downlink QoS parameter and an uplink QoS parameter of the traffic to an access network device, and indicates that the traffic has a reflective characteristic.

Having a reflective characteristic means a capability of obtaining an uplink QoS parameter of the traffic based on a downlink QoS parameter of the traffic.

S802. The access network device sends the reflective characteristic information of the traffic to the terminal.

The reflective characteristic information includes the downlink QoS parameter of the traffic and indication information that is used to indicate a capability of obtaining an uplink quality of traffic parameter based on the downlink quality of traffic parameter of the traffic.

Optionally, the reflective characteristic information may further include an uplink RB configuration of the traffic.

In step S802, the reflective characteristic information of the traffic may be sent to the terminal in a user plane or control plane manner. Refer to related description in the embodiment shown in FIG. 7 for a specific implementation process, and detailed description is omitted herein.

Optionally, the core network control plane device may update QoS information of the traffic, and send updated QoS information to the access network device. Correspondingly, the method of this embodiment may further include:

receiving, by the terminal, updated reflective characteristic information sent by the access network device, and updating the locally stored reflective characteristic information based on the updated reflective characteristic information.

Specifically, if the reflective characteristic information of the traffic is sent in a user plane manner, correspondingly, the updated reflective characteristic information of the traffic is updated by using an indication carried by a different packet header, for example, the updated reflective characteristic information is updated to having no reflective characteristic. If the reflective characteristic information of the traffic is sent in a control plane manner, correspondingly, the updated reflective characteristic information of the traffic is updated by using RRC signaling, for example, the updated reflective characteristic information is updated to having no reflective characteristic.

S803. When initiating the traffic, the terminal sends data of the traffic based on the reflective characteristic information.

Specifically, refer to related content in the embodiment shown in FIG. 7 for specific implementation of step S803, and detailed description is omitted herein.

It should be noted that, if the core network control plane device or the access network device further notifies the terminal of uplink QoS information of the traffic, the terminal may obtain the QoS parameter in two manners. In this case, the terminal may obtain the QoS parameter by using information that is obtained latterly. For example, if the terminal is first notified of the reflective characteristic information, and then receives the uplink QoS information that is notified by the core network control plane device, the terminal obtains the QoS parameter by using the uplink QoS information that is notified by the core network control plane device.

This embodiment of the present invention may further include a traffic release procedure. Specifically, the traffic release procedure includes the following two manners.

Figure 9A:
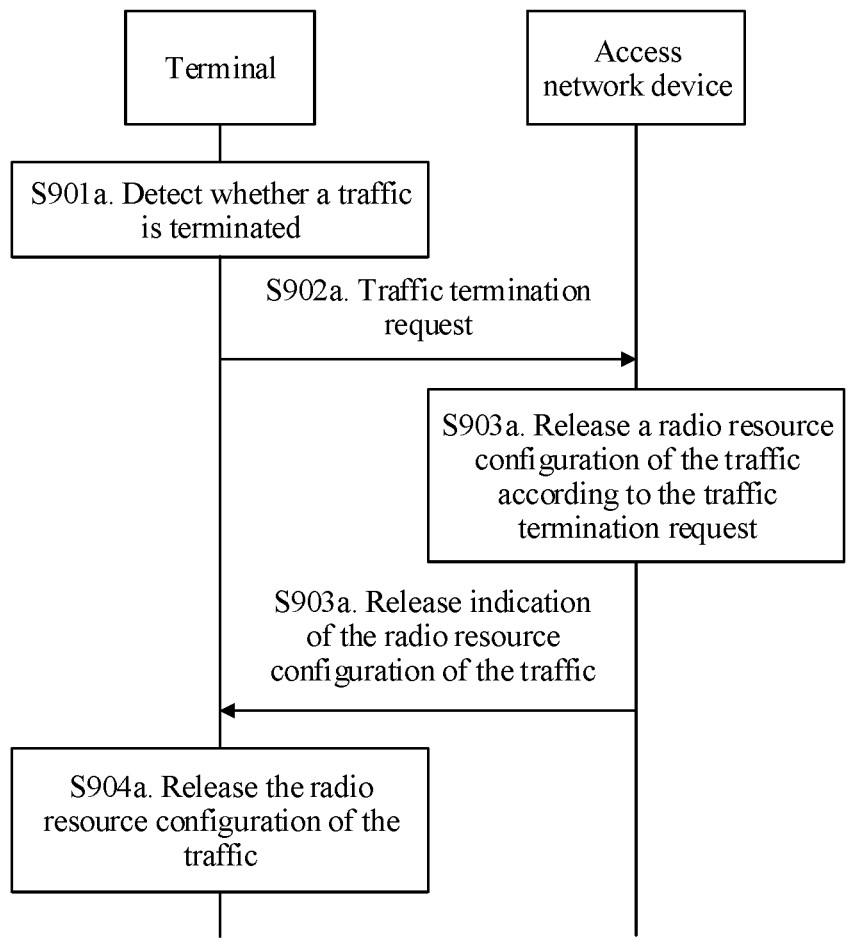
FIG. 9a is a flowchart of a traffic release procedure according to an embodiment of the present invention.

First manner (the terminal triggers a traffic release):

Referring to FIG. 9*a*, in the first manner, the method for communication in this embodiment further includes the following steps.

Step S901*a*. The terminal detects whether the traffic is terminated.

Specifically, step S901*a* may include:

detecting, by the terminal, whether a traffic end instruction of an application layer is received, and when the traffic end instruction is received, determining that the traffic is terminated; or when a data volume of the traffic is zero or less than a specified threshold, starting, by the terminal, a timer, and if the data volume of the traffic is not increased when the timer expires, determining that the traffic is terminated; or if the data volume of the traffic is increased before the timer expires, resetting the timer, and restarting the timer next time when the data volume of the traffic is zero or less than the specified threshold.

The timer may be set by the core network control plane device, is carried in the first pre-authorized QoS information, and is sent to the terminal (for example, is sent to the terminal by using a NAS message); or the timer may be set by the access network device, and the timer is sent to the terminal by using an RRC message or a user plane control PDU.

During implementation, different timer values may be configured for different traffics, and the timer may be used for both an uplink traffic and a downlink traffic, or used for only for an uplink traffic or a downlink traffic.

In addition, the specified threshold may be configured by using a manner the same as that of the timer, and detailed description is omitted herein.

Step S902a. When detecting that the traffic is terminated, the terminal sends a traffic termination request to the access network device.

The traffic termination request may be sent in a control plane or user plane manner. The control plane manner may be a manner of using an RRC message, where the RRC message includes QoS information of a data packet group that needs to be terminated and indication information for requesting traffic termination, and the QoS information is a QoS parameter identifier. The user plane manner may be a manner of using a data packet that indicates that the traffic ends. For example, a PDCP PDU is generated at a PDCP layer, and the PDCP PDU is set to an endmarker PDU, to indicate that the traffic ends. Alternatively, the PDCP PDU carries a QoS parameter identifier and traffic termination indication information, or a format of the PDCP PDU is used to indicate that the traffic is terminated.

In addition, the access network device may be further notified by using an RLC PDU or a MAC PDU, where the RLC PDU or the MAC PDU carries a QoS parameter identifier and traffic termination indication information, or a format of the PDU is used to indicate that the traffic is terminated.

In another implementation, the terminal sends an RB release request message to the access network device only when all services of a radio bearer corresponding to the terminal are terminated. The message carries an RB identifier, and further carries a cause value of an RB release request, for example, one traffic ends or all traffics end. The terminal does not send a traffic termination request to the access network device for termination of a single traffic, but only initiates a radio bearer release request.

The terminal may further notify the access network device in a user plane manner, and may use a data packet that indicates that the traffic ends. For example, a PDCP PDU is generated at a PDCP layer, and the PDCP PDU is set to an endmarker PDU, to indicate that the traffic ends, or the PDU carries all QoS parameter identifiers and traffic termination indication information, or a format of the PDU is used to indicate that the traffic is terminated. Alternatively, the PDU may carry an RB identifier. Further, the PDU does not carry the QoS parameter identifier, to indicate that all traffics carried on the RB are terminated.

Step S903a. The access network device receives the traffic termination request, releases a radio resource configuration of the traffic according to the traffic termination request, and sends a release indication of the radio resource configuration of the traffic to the terminal.

After receiving the traffic request, the access network device terminates the radio resource configuration for a data packet group of the traffic. The access network device initiates a radio resource configuration release of the data packet group to the terminal, and may notify the terminal by using an RRC message or a user plane PDU.

Step S904a. The terminal releases the radio resource configuration of the traffic according to the release indication of the radio resource configuration sent by the access network device.

The release indication may include releasing a data packet group identifier or a QoS parameter identifier of the radio resource.

Specifically, step S904a may include:

releasing, by the terminal, a correspondence between a data packet group and a radio bearer.

If the data packet group is a last data packet group of the radio bearer, a release of the radio resource configuration includes release of the radio bearer. The terminal receives the release indication, and releases the radio bearer. The release indication includes releasing an identifier of the radio bearer.

Further, the access network device may not instruct the terminal to release the correspondence between a data packet group and a radio bearer, but only instruct the terminal to release a radio bearer.

If the radio bearer is a last radio bearer of the terminal, the release indication may be an RRC link release message. The terminal receives the release indication, and releases an RRC link.

Figure 9B:
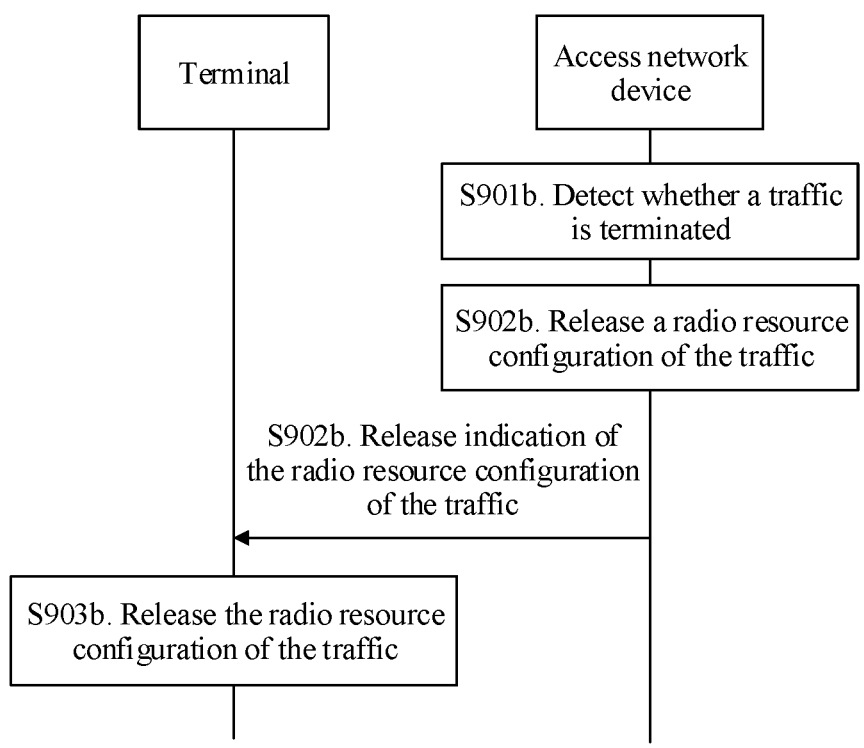
FIG. 9b is a flowchart of a traffic release procedure according to an embodiment of the present invention.

Second manner (the access network device triggers a traffic release):

Referring to FIG. 9b, in the second manner, the method for communication in this embodiment further includes the following steps.

Step S901b. The access network device detects whether the traffic is terminated.

Specifically, the access network device determines termination of a traffic (which may be an uplink traffic or a downlink traffic) by using a timer. When a data volume of the traffic is zero or less than a specified threshold, the access network device starts the timer, and if the data volume of the traffic is not increased when the timer expires, it indicates that the traffic is terminated; or if the data volume of the traffic is increased before the timer expires, the access network device resets the timer, and restarts the timer next time when the data volume of the traffic is zero or less than the specified threshold.

The timer may be set in one of the following two manners:

In a first manner, the core network control plane device sets the timer, the timer is included in pre-authorized QoS information, and the core network control plane device sends the pre-authorized QoS information to the access network device. Certainly, the timer may also be included in another message and sent to the access network device.

In a second manner, the access network device sets the timer.

The threshold for triggering a start of the timer may be set by the core network control plane device or the access network device.

Method 1: The core network control plane device sets the threshold for triggering the start of the timer, the threshold is included in pre-authorized QoS information or another message, and the core network control plane device sends the pre-authorized QoS information or the another message to the access network device.

Method 2: The access network device sets the threshold for triggering the start of the timer, and the access network device determines termination of a traffic by using the timer.

Step S902b. The access network device releases a radio resource configuration of the traffic, and sends a release indication of the radio resource configuration of the traffic to the terminal.

Refer to step S903a for a specific process, and detailed description is omitted herein.

Step S903b. The terminal receives the release indication of the radio resource of the traffic, and releases the radio resource configuration of the traffic according to the release indication of the radio resource configuration sent by the access network device.

Refer to step S904a for a specific process, and detailed description is omitted herein.

Further, the access network device may not instruct the terminal to release the correspondence between a data packet group and a radio bearer, but only instruct the terminal to release a radio bearer.

Further, if the radio bearer is a last radio bearer of the terminal, the release indication may be an RRC link release message.

According to this implementation, the access network device and/or the terminal detect/detects termination of the traffic by using the timer, and release/releases a radio resource configured for the traffic. Compared with the prior art in which a traffic release is notified in a signaling manner, in this implementation, overheads of a traffic termination notification message are reduced, and the radio resource is released in a timely manner, thereby improving utilization of radio resources and enhancing a network capacity.

It should be noted that, the traffic release procedures shown in FIG. 9a and FIG. 9b may be combined with the embodiments shown in FIG. 5, FIG. 6, FIG. 7, and FIG. 8.

Referring to FIG. 10, FIG. 10 shows another method for communication according to an embodiment of the present invention. The method is implemented by using the system shown in FIG. 1. In the embodiment shown in FIG. 10, a NAS PDU carries user data to implement a fast start of an uplink traffic. The method includes the following steps.

S1001. A terminal sends an AS message to an access network device.

The AS message carries a NAS PDU, and the NAS PDU includes user data.

The AS message may be an RRC message, and the RRC message includes one of an RRC connection request, an RRC connection reestablishment request, a UE information response message, and the like.

Further, the NAS PDU includes session information, and the access network device forwards the NAS PDU to a target core network control plane device based on the session information.

S1002. The access network device receives the AS message, and forwards a NAS PDU to a core network control plane device.

By using S1001 and S1002, the user data may be carried in the NAS PDU and sent to the core network control plane device.

S1003. The core network control plane device detects user data in the NAS PDU, and determines QoS information corresponding to the user data.

Specifically, the QoS information corresponding to the user data may be determined with reference to policy information.

Content of the QoS information may be the same as that of the second pre-authorized QoS information in step S501, and detailed description is omitted herein.

S1004. The core network control plane device notifies a core network user plane device, the access network device, and the terminal of the QoS information.

Optionally, the method further includes: notifying, by the core network control plane device, the terminal of the QoS information. The terminal may be notified of a part of the QoS information, for example, only a packet filter and a maximum rate parameter.

S1005. The core network control plane device obtains the user data from a NAS layer PDU, and sends the user data to an application server.

In an implementation, S1005 may include: directly forwarding, by the core network control plane, the user data to the application server. In this implementation, the core network control plane device may establish a data channel between the core network control plane device and the application server for the terminal, and this data channel may be in a form of an IP tunnel. The core network control plane device may establish the data channel for the terminal in a terminal attachment process, maintain the data channel, and release the data channel when the terminal is detached.

In another implementation, S1005 may include: sending, by the core network control plane device, the user data to the core network user plane device, so that the core network user plane device sends the user data to the application server. A data channel between the core network user plane device and the application server is established, and the core network control plane device may establish the data channel for the terminal in the terminal attachment process, maintain the data channel, and release the data channel when the terminal is detached.

S1006. The access network device receives the QoS information sent by the core network control plane device, and configures a radio resource for the traffic based on the received QoS information.

S1007. The access network device sends radio resource configuration information to the terminal.

Refer to step S502 for specific implementation processes of steps S1006 and S1007, and detailed description is omitted herein.

S1008. The terminal receives the radio resource configuration information sent by the access network device, and sends data based on the radio resource configuration information.

Refer to related description in the embodiment shown in FIG. 5 for a specific process, and detailed description is omitted herein.

Further, the radio resource configuration information may further indicate which radio bearer is a default radio bearer. The default radio bearer may be established for each session, and is configured to carry a default QoS traffic.

In this embodiment, the terminal sends initial data of the traffic to an accurate core network control plane device by using a NAS, so that an uplink data transmission speed can be increased, and a traffic start is accelerated, thereby improving user experience.

Referring to FIG. 11, FIG. 11 shows another method for communication according to an embodiment of the present invention. The method is implemented by using the system shown in FIG. 1. In the embodiment shown in FIG. 11, data is sent by using a common bearer. The method includes the following steps.

S1101. In a PDN connection process, a core network control plane device interacts with an access network device, to establish a common bearer between a core network user plane device and the access network device.

The common bearer is a user plane data channel, and is configured to transmit a data packet between the access network device and the core network user plane device. Specifically, the common bearer is a data channel other than a data channel, corresponding to a default bearer, between the access network device and the core network user plane device, and is configured to transmit traffic data for which no QoS has been configured. For example, new data triggered by an uplink traffic of the terminal may be first sent to the core network user plane device, and QoS information may be configured subsequently, and the data that is first sent to the core network user plane device is the traffic data for which no QoS has been configured.

During implementation, the common bearer may be established based on a PDU session. In other words, each session is uniquely corresponding to one common bearer. The common bearer may also be established based on a node. In other words, the access network device and an access network user plane device are uniquely corresponding to one common bearer.

The default bearer is applicable to a non-GBR traffic. When a new traffic is established, if the default bearer cannot carry the traffic, a new dedicated bearer needs to be established for the traffic. Before the new dedicated bearer is established, data of the new traffic is sent by using the common bearer.

Step S1102. When a terminal needs to send user data of a new traffic, the terminal sends the user data of the new traffic to the access network device.

The new traffic is a traffic for which no QoS parameter has been configured.

Specifically, the terminal may send the user data of the new traffic to the access network device in any one of the following manners:

First manner: User data of a new uplink traffic is sent by using an SRB, for example, by using an SRB1 or an SRB2 or a new SRB.

Specifically, the terminal may send the new user data by using the SRB after an RRC connection is established. For example, a message 1 may be newly defined, and the message 1 is specially used to send user data, of the new traffic, for which no QoS has been configured. Further, the message 1 further includes session information of the user data, where the session information may include at least one of the following: an APN; a PDN GW identifier; a PDN GW address (an IP address or a non-IP address); an IP address allocated by a PDN GW to the terminal; a session identifier; and a DN identifier. Further, the newly-defined message 1 further includes new data indication information, used to indicate that the data packet is a new data packet, namely, a data packet for which no QoS parameter has been configured. Specifically, the new data indication information may be carried by using a message name or message content.

Second manner: The access network device establishes, for each terminal, a data radio bearer specially for transmitting user data for which no QoS has been configured, and the terminal transmits, on the data radio bearer, all user data packets for which no QoS has been configured, where session information is carried in an air interface data packet header. Specifically, the session information may be carried in an unoccupied field of an IP header of an air interface data packet, or a protocol header may be added outside a data packet IP layer, and the session information is carried in the protocol header. Alternatively, the session information is carried in a PDCP protocol header. It should be noted that, if the data radio bearer is established corresponding to each session, namely, a DRB is established for each session, the data packet header does not need to carry the session information.

Figure 12A:
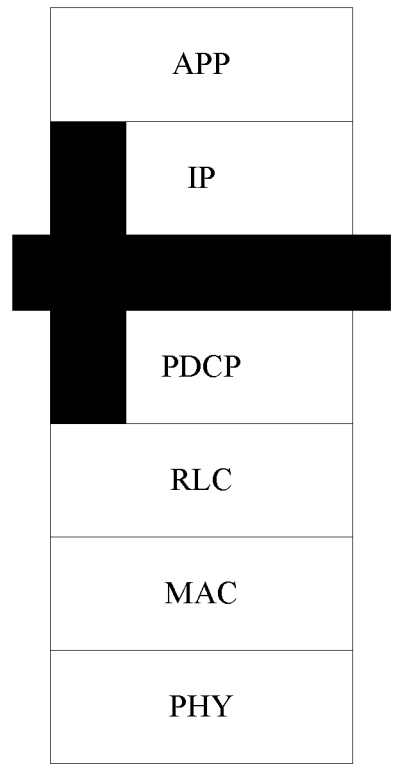
FIG. 12a is a schematic diagram of a manner of carrying new data indication information in a method for communication according to an embodiment of the present invention.

Third manner: The access network device establishes a DRB for the terminal corresponding to each session, and the terminal transmits, on the radio bearer, a new user data packet, of the session, for which no QoS has been configured, where new data indication information is carried in an air interface data packet header. Specifically, the new data indication information may be carried in an unoccupied field of an IP header of an air interface data packet; or a protocol header may be added outside a data packet IP layer, and the new data indication information is carried in the protocol header; or the new data indication information may be carried in a PDCP header, as shown in a black part in FIG. 12a.

Step S1103. The access network device receives the data of the new traffic sent by the terminal, and sends the received data of the new traffic to the core network user plane device through a ground side channel.

Specifically, for the first and the third manners of step S1102 in which the terminal sends the user data of the new traffic to the access network device, the access network device may learn, based on the new data indication information, that the user data of the new traffic is a data packet, of the traffic, for which no QoS parameter has been configured. For the second manner of step S1102 in which the terminal sends the user data of the new traffic to the access network device, the access network device may learn, based on an attribute of the data radio bearer, that the user data of the new traffic is a data packet, of the traffic, for which no QoS parameter has been configured.

In step S1103, the access network device first removes the new data indication information in the second and the third manners, and then sends the data to the core network user plane device.

Figure 12B:
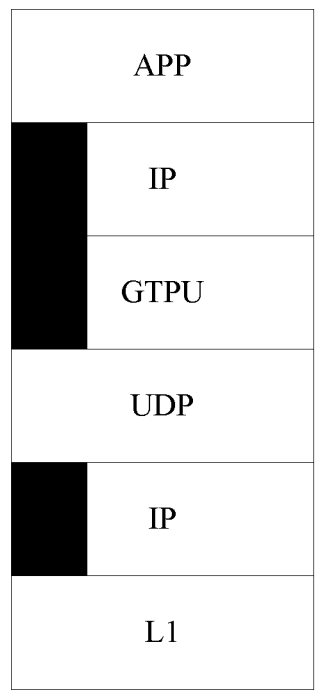
FIG. 12b is a schematic diagram of a manner of carrying session information in a method for communication according to an embodiment of the present invention.

In this embodiment, the access network device may send the data of the new traffic to the core network user plane device by using the common bearer, where the common bearer is exclusively configured to transmit the data packet, of the traffic, for which no QoS parameter has been configured. Further, the session information may be carried in the data packet. Specifically, the session information may be carried in a tunnel protocol header. For example, if a GPRS tunneling protocol user plane (GPRS Tunneling Protocol User Plane, GTPU for short) tunnel is used, the session information is carried in a GTPU header. The session information may also be carried in an application layer IP header or a transport layer IP header, as shown in a black part in FIG. 12b.

In another embodiment, the access network device may send the data of the new traffic to the core network user plane device through a tunnel, and the data packet, for which no QoS parameter has been configured, that is of the traffic and that is transmitted on the tunnel carries new data indication information. Specifically, the new data indication information may be carried in a tunnel protocol header. If a GTPU tunnel is used, the new data indication information is carried in a GTPU header. Alternatively, the new data indication information may be carried in an application layer IP header or a transport layer IP header. In this case, step S1101 does not need to be performed.

Further, one common bearer or tunnel between the access network device and the core network user plane device may be established for each PDU session, and the access network device selects, based on a PDU session to which the data of the new traffic belongs, a common bearer or a tunnel corresponding to the PDU session, and sends the data.

Step S1104. The core network user plane device receives the data of the new traffic on the common bearer, and sends the data of the new traffic to a corresponding DN.

Step S1105. The core network user plane device notifies the core network control plane device of the data of the new traffic.

Specifically, because the common bearer is exclusively configured to send the data of the traffic for which no QoS parameter has been configured, the core network user plane device may know that data transmitted on the common bearer is the data of the traffic for which no QoS parameter has been configured, and after receiving the data transmitted on the common bearer, sends the data to the core network control plane device, to trigger a QoS authorization process.

Step S1106. The core network control plane device generates authorized QoS information, and the core network control plane device sends the QoS information to the core network user plane device, the access network device, and the terminal.

Step S1107. The access network device configures a radio resource for the new traffic of the terminal based on the QoS information.

After configuration, the access network device sends radio resource configuration information to the terminal. After receiving the radio resource configuration information, the terminal sends the data of the new traffic on the corresponding radio resource based on the radio resource configuration information, for example, transmits the data on a data radio bearer corresponding to the new traffic. Refer to related description in the embodiment shown in FIG. 5 for a specific process, and detailed description is omitted herein.

Further, in this embodiment, if QoS information such as a QoS parameter identifier is carried in a packet header of a data packet for which a QoS parameter is configured, a location that is in the packet header of the data packet and that carries the QoS parameter identifier may be set to null, to indicate that the data packet is new data, that is, a data packet for which no QoS parameter has been configured.

In this embodiment, the terminal sends an uplink new data packet to the access network device, the access network device selects a target core network user plane device and sends the uplink new data packet to the target core network user plane device based on new data packet indication and/or session information of the data packet, to trigger a QoS authorization process, so that new data is accurately sent to the target core network user plane device, to initiate the new traffic, thereby ensuring normal initiation of a traffic establishment procedure.

The following are apparatus embodiments in embodiments of the present invention. Refer to the foregoing corresponding method embodiments for details that are not specifically described in the apparatus embodiments.

Figure 13:
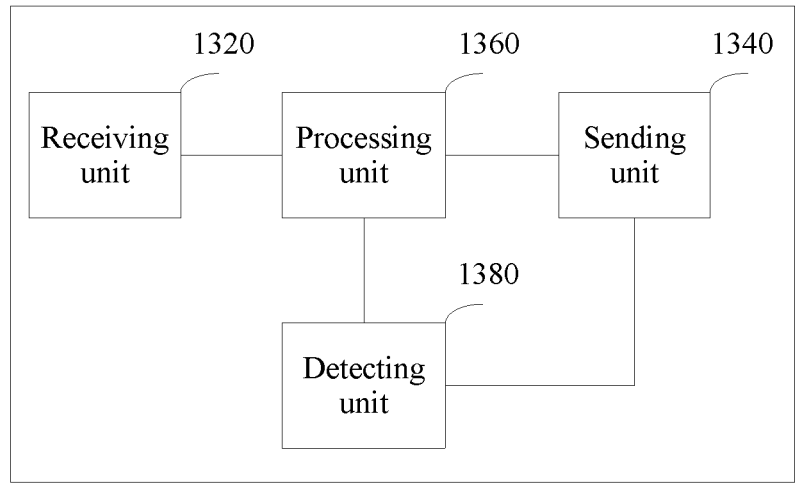
FIG. 13 is a schematic structural diagram of an apparatus for communication according to an embodiment of the present invention.

FIG. 13 is a block diagram of an apparatus for communication according to an embodiment of the present invention. The apparatus for communication may be implemented as a whole or a part of a terminal by using a dedicated hardware circuit or a combination of software and hardware. The apparatus for communication includes a receiving unit 1320 and a sending unit 1340. The receiving unit 1320 is configured to receive first QoS information before the terminal initiates a traffic. The sending unit 1340 is configured to: when the terminal initiates the traffic, send, based on the first QoS information received by the receiving unit 1320, data of the traffic by using a radio resource that is configured by an access network device for the traffic, where the radio resource is configured by the access network device based on second QoS information, and both the first QoS information and the second QoS information are configured by a core network control plane device for the traffic of the terminal before the terminal initiates the traffic.

The first QoS information includes at least one of first pre-authorized QoS information and reflective characteristic information, and the reflective characteristic information includes a downlink QoS parameter of a traffic and indication information that is used to indicate a capability of reflection.

Optionally, the sending unit 1340 is further configured to send QoS request information to the access network device, so that the access network device configures a radio resource for the traffic of the terminal based on the QoS request information.

Further, the QoS request information may include uplink QoS information, where the uplink QoS information includes at least a part of the first pre-authorized QoS information, or the uplink QoS information includes a QoS parameter obtained based on the downlink QoS parameter of the traffic. Optionally, the QoS request information further includes at least one of a protocol data unit PDU session information and identification information of network slice of the traffic.

Still further, if the receiving unit 1320 first receives the first pre-authorized QoS information and then receives the reflective characteristic information, the uplink QoS information includes the QoS parameter obtained based on the downlink QoS parameter of the traffic, or if the receiving unit 1320 first receives the reflective characteristic information and then receives the first pre-authorized QoS information, the uplink QoS information includes at least a part of the first pre-authorized QoS information.

Optionally, the receiving unit 1320 is further configured to receive updated reflective characteristic information sent by the access network device, where the updated reflective characteristic information is carried in a data packet header or is sent by using radio resource control RRC signaling.

Optionally, the receiving unit 1320 is further configured to receive updated first pre-authorized QoS information sent by the core network control plane device, where the updated first pre-authorized QoS information is sent by the core network control plane device in an area update procedure or a process in which the terminal is handed over between different access network devices.

Optionally, the apparatus further includes a processing unit 1360. In an implementation, the processing unit 1360 is configured to filter the data of the traffic by using a packet filter indicated by the first pre-authorized QoS information. Therefore, the sending unit 1340 is configured to send, to the access network device by using a radio bearer corresponding to the packet filter indicated by the first QoS information, the data packet selected by the processing unit. In another implementation, the processing unit 1360 is configured to determine a radio bearer corresponding to the traffic, and the sending unit 1340 is configured to send the data of the traffic to the access network device by using the radio bearer determined by the processing unit.

In an implementation of this embodiment, the apparatus further includes a detecting unit 1380. The detecting unit 1380 is configured to detect whether the traffic is terminated. Correspondingly, the sending unit 1340 is further configured to: when the terminal detects that the traffic is terminated, send a traffic termination request to the access network device, or when the terminal detects that traffics corresponding to a same radio bearer are all terminated, send a radio bearer release request to the access network device.

Specifically, the detecting unit 1380 is configured to start a timer when a data volume of the traffic is zero or less than a specified threshold, and if the data volume of the traffic is not increased when the timer expires, determine that the traffic is terminated.

During implementation, the sending unit is configured to send a traffic termination request to the access network device in a user plane or control plane manner.

Refer to the method embodiment in FIG. 5, FIG. 6, FIG. 7, FIG. 8, or FIG. 9a and FIG. 9b for related details.

It should be noted that, the receiving unit 1320 may be implemented by using a receiver, or implemented through coordination of a processor and a receiver; the sending unit 1340 may be implemented by using a transmitter, or implemented through coordination of a processor and a transmitter; and the processing unit 1360 and the detecting unit 1380 may be implemented by using a processor, or implemented by a processor by executing a program instruction in a memory.

Figure 14:
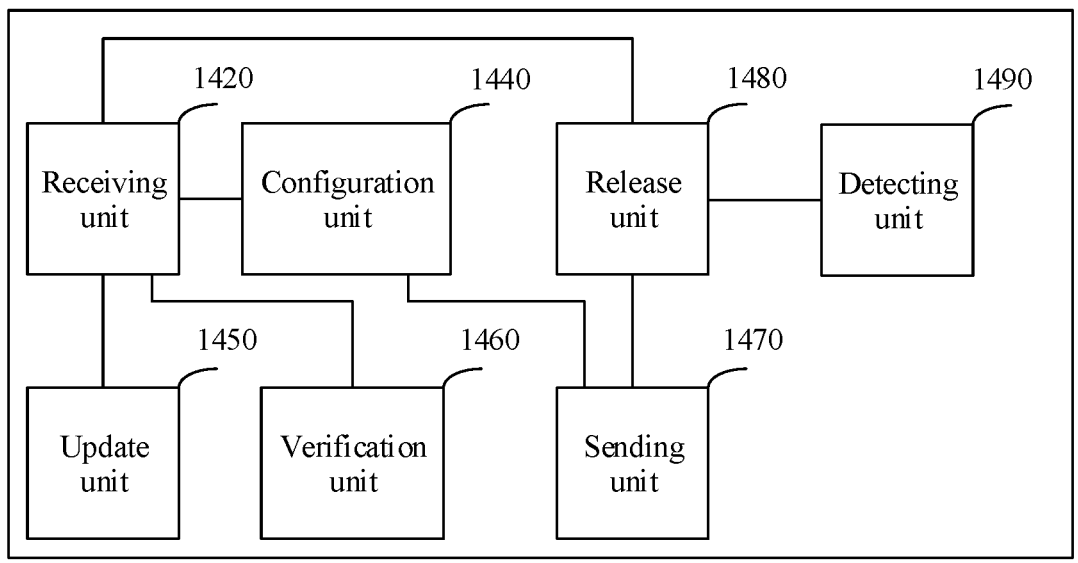
FIG. 14 is a schematic structural diagram of another apparatus for communication according to an embodiment of the present invention.

FIG. 14 is a block diagram of an apparatus for communication according to another embodiment of the present invention. The apparatus for communication may be implemented as a whole or a part of a first access network device by using a dedicated hardware circuit or a combination of software and hardware. The apparatus for communication includes a receiving unit 1420 and a configuration unit 1440. The receiving unit 1420 is configured to receive second QoS information. The configuration unit 1440 is configured to configure a radio resource for a terminal based on the second QoS information. The receiving unit 1420 is further configured to receive data of a traffic that is sent by the terminal by using the radio resource, where the data of the traffic is sent by the terminal based on first QoS information, the first QoS information is received before the terminal initiates the traffic, and both the first QoS information and the second QoS information are configured by a core network control plane device for the traffic of the terminal before the terminal initiates the traffic.

Specifically, the configuration unit 1440 is configured to establish a radio bearer and a correspondence between a data packet group and the radio bearer based on the second QoS information, or establish a correspondence between a data packet group and a radio bearer based on the second QoS information.

The second QoS information includes at least one of second pre-authorized QoS information and reflective characteristic information, and the reflective characteristic information includes a downlink QoS parameter of a traffic and indication information that is used to indicate a capability of obtaining an uplink QoS parameter based on the downlink QoS parameter of the traffic.

Further, the second pre-authorized QoS information may include at least one of first indication information, second indication information, and validation range information. The first indication information is used to indicate whether to pre-configure a radio resource for a corresponding data packet group; the second indication information is used to indicate whether to pre-establish a ground side channel for the corresponding data packet group, and the ground side channel is a data channel between an access network device and a core network user plane device; and the validation range information is used to indicate a geographic area in which the second pre-authorized QoS information is effective.

Still further, the configuration unit 1440 is configured to: when the second QoS information is the second pre-authorized QoS information, and the first indication information indicates that a radio resource needs to be pre-configured for the corresponding data packet group, immediately configure a radio resource for the corresponding data packet group based on the second pre-authorized QoS information if the receiving unit receives the second pre-authorized QoS information.

Optionally, the apparatus further includes an update unit 1450. The receiving unit 1420 is further configured to receive updated second QoS information sent by the core network control plane device; and the update unit 1450 is configured to update the locally stored second QoS information by using the updated second QoS information received by the receiving unit 1420.

In an implementation, the receiving unit 1420 is further configured to receive QoS request information sent by the terminal; and the configuration unit 1440 is configured to configure a radio resource for the terminal based on the QoS request information received by the receiving unit.

Optionally, the apparatus may further include a verification unit 1460, configured to verify the QoS request information; and correspondingly, the configuration unit 1440 is configured to configure a radio resource for the terminal when the verification on the QoS request information succeeds.

Optionally, the apparatus may further include a sending unit 1470. The sending unit 1470 is configured to send the reflective characteristic information of the traffic to the terminal.

In an implementation, the apparatus further includes a release unit 1480. The receiving unit 1420 is further configured to receive a traffic release request sent by the terminal; and the release unit 1480 is configured to release, according to the traffic release request received by the receiving unit 1420, the radio resource allocated to the traffic, and instruct the terminal to release a radio resource configuration of the traffic.

In another implementation, the apparatus may further include a detecting unit 1490. The detecting unit 1490 is configured to detect whether the traffic is terminated. The release unit 1480 is configured to: when the detecting unit detects that the traffic is terminated, release, according to a traffic release request of the terminal, the radio resource allocated to the traffic, and instruct the terminal to release a radio resource configuration of the traffic.

In another implementation, the receiving unit 1420 is configured to receive a handover request message sent by a second access network device, where the handover request message includes the second QoS information.

Further, the handover request message carries at least one of third indication information and data transmission indication information, where the third indication information is used to indicate whether a radio bearer has been established for a corresponding data packet group on a source side, and the data transmission indication information is used to indicate whether data of the corresponding data packet group has been transmitted or is being transmitted.

Correspondingly, the configuration unit is configured to determine, based on at least one of the following information, whether to configure a radio resource for the terminal: whether the second access network device has established a radio bearer for the data packet group, whether data of the data packet group for which the second access network device has established a radio bearer has been transmitted, and whether the data of the data packet group for which the second access network device has established a radio bearer is being transmitted.

In this case, the sending unit 1470 is configured to send a handover response message to the second access network device, where the handover response message includes a handover preparation success message and a handover preparation failure message, the handover preparation success message is used to indicate that the first access network device determines to admit all or some resources requested by the handover request message, and the handover preparation failure message is used to indicate that the first access network device determines not to admit a resource requested by the handover request message.

The handover preparation success message and the handover preparation failure message carry a handover failure cause, where the handover failure cause is one of the following: there is no available radio resource, pre-establishment of a radio bearer with pre-authorized QoS is not supported, a QoS parameter is not supported, and a geographic area is not supported.

Refer to the method embodiment in FIG. 5, FIG. 6, FIG. 7, FIG. 8, or FIG. 9a and FIG. 9b for related details.

It should be noted that, the sending unit 1470 may be implemented by using a transmitter, or implemented through coordination of a processor and a transmitter; the receiving unit 1420 may be implemented by using a receiver Rx, or implemented through coordination of a processor and a receiver; and the configuration unit 1440, the verification unit 1460, the update unit 1450, the release unit 1480, and the detecting unit 1490 may be implemented by using a processor, or implemented by a processor by executing a program instruction in a memory.

Figure 15:
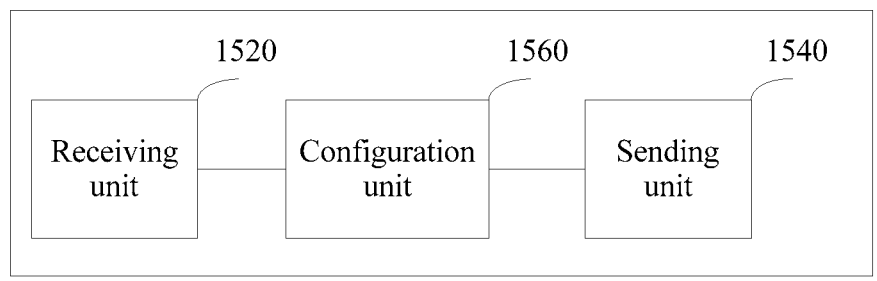
FIG. 15 is a schematic structural diagram of another apparatus for communication according to an embodiment of the present invention.

FIG. 15 is a block diagram of an apparatus for communication according to an embodiment of the present invention. The apparatus for communication may be implemented as a whole or a part of a terminal by using a dedicated hardware circuit or a combination of software and hardware. The apparatus for communication includes a receiving unit 1520, a sending unit 1540, and a configuration unit 1560. The sending unit 1540 is configured to send, to a core network control plane device, a data packet, for which no QoS parameter has been configured, that is of a traffic and that is sent by a terminal. The receiving unit 1520 is configured to receive QoS information sent by the core network control plane, where the QoS information is generated based on the data packet, of the traffic, for which no QoS parameter has been configured. The configuration unit 1560 is configured to configure a radio resource for the traffic based on the QoS information received by the receiving unit.

In an implementation, the receiving unit 1520 is configured to receive an access stratum AS message sent by the terminal, where the AS message includes a non-access stratum protocol data unit NAS PDU, and the data packet for which no QoS parameter has been configured is carried in the NAS PDU; and the sending unit 1540 is configured to forward the NAS PDU to the core network control plane device.

In another implementation, the receiving unit 1520 is configured to receive the data packet, for which no QoS parameter has been configured, that is of the traffic and that is sent by the terminal by using any one of a signaling radio bearer, a common radio bearer, and a default radio bearer, where the common radio bearer is exclusively configured to send the data packet for which no QoS parameter has been configured, and the data packet, of the traffic, for which no QoS parameter has been configured carries new data indication information. The sending unit 1540 is configured to send, to the core network control plane device, the received data packet, of the traffic, for which no QoS parameter has been configured, where the data packet, of the traffic, for which no QoS parameter has been configured is sent to a core network user plane device through a ground side channel, and then is sent to the core network control plane device by the core network user plane device.

Further, the data packet, for which no QoS parameter has been configured, that is of the traffic and that is transmitted on the signaling radio bearer or the common radio bearer further includes PDU session information of the traffic. Still further, the PDU session information of the traffic is carried in a tunnel protocol header of the data packet, or is carried in an application layer IP header of the data packet, or is carried in a transport layer IP header of the data packet.

Further, the ground side channel is a common bearer or a tunnel. The common bearer is exclusively configured to transmit the data packet, of the traffic, for which no QoS parameter has been configured. The data packet, for which no QoS parameter has been configured, that is of the traffic and that is transmitted on the tunnel carries new data indication information. Still further, the new data indication information is carried in a tunnel protocol header of the data packet, or is carried in an application layer IP header of the data packet, or is carried in a transport layer IP header of the data packet.

Refer to the method embodiment in FIG. 10 or FIG. 11 for related details.

It should be noted that, the sending unit 1540 may be implemented by using a transmitter, or implemented through coordination of a processor and a transmitter; the receiving unit 1520 may be implemented by using a receiver Rx, or implemented through coordination of a processor and a receiver; and the configuration unit 1560 may be implemented by using a processor, or implemented by a processor by executing a program instruction in a memory.

Figure 16:
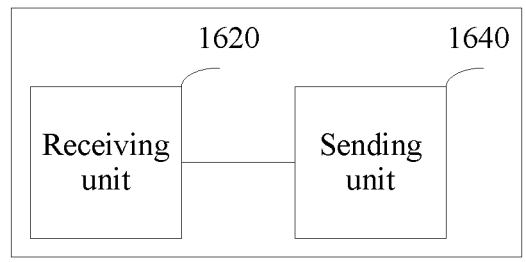
FIG. 16 is a schematic structural diagram of another apparatus for communication according to an embodiment of the present invention.

FIG. 16 is a block diagram of an apparatus for communication according to an embodiment of the present invention. The message sending apparatus may be implemented as a whole or a part of a terminal by using a dedicated hardware circuit or hardware and software combination. The apparatus for communication includes a receiving unit 1620 and a sending unit 1640. The sending unit 1640 is configured to send, to a core network control plane device, a data packet, of a traffic, for which no QoS parameter has been configured; the receiving unit 1620 is configured to receive radio resource configuration information sent by an access network device, where the radio resource configuration information is configured by the access network device based on received QoS information sent by the core network control plane, and the QoS information is generated based on the data packet, of the traffic, for which no QoS parameter has been configured; and the sending unit 1640 is further configured to send data of the traffic based on the radio resource configuration information.

In an implementation, the sending unit 1640 is configured to send an access stratum AS message to the access network device, where the AS message includes a non-access stratum protocol data unit NAS PDU, the data packet for which no QoS parameter has been configured is carried in the NAS PDU, and the access network device sends the NAS PDU to the core network control plane device.

In another implementation, the sending unit 1640 is configured to send, to the access network device by using any one of a signaling radio bearer, a common radio bearer, and a default radio bearer, the data packet, of the traffic, for which no QoS parameter has been configured, so that the access network device forwards the data packet to the core network control plane device, where the common radio bearer is exclusively configured to send the data packet for which no QoS parameter has been configured, and the data packet, of the traffic, for which no QoS parameter has been configured carries new data indication information.

Further, the data packet, for which no QoS parameter has been configured, that is of the traffic and that is transmitted on the signaling radio bearer or the common radio bearer further includes PDU session information of the traffic. Still further, the PDU session information of the traffic is carried in a tunnel protocol header of the data packet, or is carried in an application layer IP header of the data packet, or is carried in a transport layer IP header of the data packet.

Refer to the method embodiment in FIG. 10 or FIG. 11 for related details.

It should be noted that, the sending unit 1640 may be implemented by using a transmitter, or implemented through coordination of a processor and a transmitter; and the receiving unit 1620 may be implemented by using a receiver Rx, or implemented through coordination of a processor and a receiver.

Figure 17:
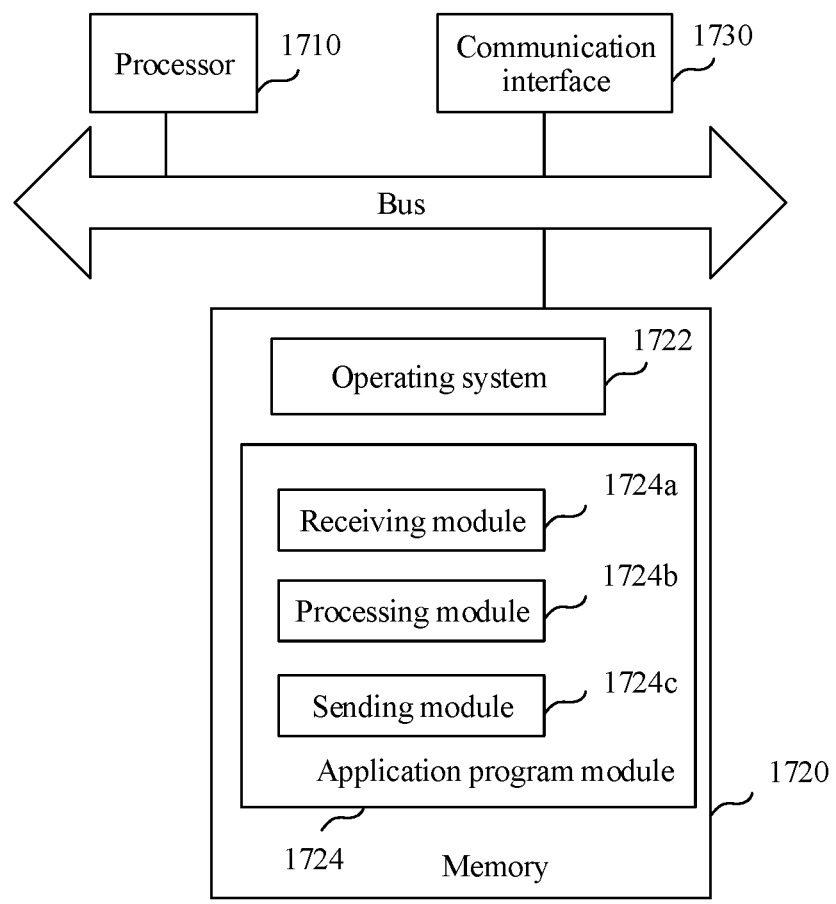
FIG. 17 is a schematic structural diagram of a chip for communication according to an embodiment of the present invention.

FIG. 17 is a structural diagram of a communication chip according to an embodiment of the present invention, where the communication chip is applied for a device of mobile communication system, such as the foregoing access network device, terminal, or core network control plane device. The communication chip includes a processor 1710, a memory 1720, and a communication interface 1730. The processor 1710 is separately connected to the memory 1720 and the communication interface 1730 by using a bus.

The communication interface 1730 is configured to communicate with another device for communication.

The processor 1710 includes one or more processing cores. The processor 1710 runs an operating system or an application program module, to execute various function applications and information processing.

Optionally, the memory 1720 may store an operating system 1722 and an application program module 1724 that is required by at least one function. Optionally, the application program module 1724 includes a receiving module 1724a, a processing module 1724b, and a sending module 1724c. The receiving module 1724a is configured to implement steps related to receiving; the processing module 1724b is configured to implement steps related to calculation and processing; and the sending module 1724c is configured to implement steps related to sending.

In addition, the memory 1720 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

A person skilled in the art can understand that the structure shown in FIG. 17 constitutes no limitation on the communication chip, and the communication chip may include more or fewer components than those shown in the figure, or some components may be combined, or the components may be disposed in a different manner.

With reference to the foregoing feasible designs in this application, the present invention further provides the following optional embodiments:

Embodiment 1: A method for communication is provided, where the method includes:

before initiating a traffic, receiving, by a terminal, first quality of service information; and when initiating the traffic, sending, by the terminal based on the first quality of service information, data of the traffic by using a radio resource that is configured by an access network device for the traffic, where the radio resource is configured by the access network device based on second quality of service information, and both the first quality of service information and the second quality of service information are configured by a core network control plane device for the traffic of the terminal before the terminal initiates the traffic.

Embodiment 2: In the method according to Embodiment 1, the first quality of service information includes at least one of first pre-authorized quality of service information and reflective characteristic information, where the reflective characteristic information includes a parameter of downlink quality of service of the traffic and indication information that is used to indicate a capability of obtaining a parameter of uplink quality of service based on a parameter of downlink quality of service of the traffic.

Embodiment 3: In the method according to Embodiment 2, the method further includes:

sending, by the terminal, quality of service request information to the access network device, so that the access network device configures a radio resource for the traffic of the terminal based on the quality of service request information, where the quality of service request information includes uplink quality of service information, and the uplink quality of service information includes at least a part of the first pre-authorized quality of service information, or the uplink quality of service information includes a quality of service parameter obtained based on the downlink quality of service parameter of the traffic.

Embodiment 4: In the method according to Embodiment 3, the quality of service request information further includes at least one of protocol data unit PDU session information and identification information of network slice of the traffic.

Embodiment 5: In the method according to Embodiment 3, the method further includes:

if the terminal first receives the first pre-authorized quality of service information and then receives the reflective characteristic information, the uplink quality of service information includes the quality of service parameter obtained based on the downlink quality of service parameter of the traffic, or if the terminal first receives the reflective characteristic information and then receives the first pre-authorized quality of service information, the uplink quality of service information includes at least a part of the first pre-authorized quality of service information.

Embodiment 6: In the method according to Embodiment 2, the method further includes:

receiving, by the terminal, updated reflective characteristic information sent by the access network device, where the updated reflective characteristic information is carried in a data packet header or is sent by using radio resource control RRC signaling; or the method further includes:

receiving, by the terminal, updated first pre-authorized quality of service information sent by the core network control plane device, where the updated first pre-authorized quality of service information is sent by the core network control plane device in an area update procedure or a process in which the terminal is handed over between different access network devices.

Embodiment 7: In the method according to any one of Embodiments 1 to 6, the method further includes:

detecting, by the terminal, whether the traffic is terminated; and when the terminal detects that the traffic is terminated, sending, by the terminal, a traffic termination request to the access network device in a user plane manner; or when the terminal detects that traffics corresponding to a same radio bearer are all terminated, sending, by the terminal, a radio bearer release request to the access network device.

Embodiment 8: In the method according to Embodiment 7, the detecting, by the terminal, whether the traffic is terminated includes:

when a data volume of the traffic is zero or less than a specified threshold, starting, by the terminal, a timer, and if the data volume of the traffic is not increased when the timer expires, determining that the traffic is terminated.

Embodiment 9: A method for communication is provided, where the method includes:

receiving, by a first access network device, second quality of service information;

configuring, by the first access network device, a radio resource for a terminal based on the second quality of service information; and receiving, by the first access network device, data of a traffic that is sent by the terminal by using the radio resource, where the data of the traffic is sent by the terminal based on first quality of service information, the first quality of service information is received before the terminal initiates the traffic, and both the first quality of service information and the second quality of service information are configured by a core network control plane device for the traffic of the terminal before the terminal initiates the traffic.

Embodiment 10: In the method according to Embodiment 9, the configuring, by the first access network device, a radio resource for a terminal based on the second quality of service information includes:

establishing, by the first access network device, a radio bearer and a correspondence between a data packet group and the radio bearer based on the second quality of service information, or establishing a correspondence between a data packet group and a radio bearer based on the second quality of service information.

Embodiment 11: In the method according to Embodiment 9, the second quality of service information includes at least one of second pre-authorized quality of service information and reflective characteristic information, where the reflective characteristic information includes a downlink quality of service parameter of the traffic and indication information that is used to indicate a capability of obtaining an uplink quality of service parameter based on the downlink quality of service parameter of the traffic.

Embodiment 12: In the method according to Embodiment 11, where the second pre-authorized quality of service information includes at least one of first indication information, second indication information, and validation range information; the first indication information is used to indicate whether to pre-configure a radio resource for a corresponding data packet group; the second indication information is used to indicate whether to pre-establish a ground side channel for the corresponding data packet group, and the ground side channel is a data channel between an access network device and a core network user plane device; and the validation range information is used to indicate a geographic area in which the second pre-authorized quality of service information is effective.

Embodiment 13: In the method according to Embodiment 12, the configuring, by the first access network device, a radio resource for a terminal based on the second quality of service information includes:

when the second quality of service information is the second pre-authorized quality of service information, and the first indication information indicates that a radio resource needs to be pre-configured for the corresponding data packet group, immediately configuring, by the first access network device, a radio resource for the corresponding data packet group based on the second pre-authorized quality of service information when receiving the second pre-authorized quality of service information.

Embodiment 14: In the method according to Embodiment 9, the method further includes:

receiving, by the first access network device, updated second quality of service information sent by the core network control plane device; and updating, by the first access network device, the locally stored second quality of service information by using the updated second quality of service information.

Embodiment 15: In the method according to Embodiment 9, the configuring, by the first access network device, a radio resource for a terminal based on the second quality of service information includes:

receiving, by the first access network device, quality of service request information sent by the terminal, where the quality of service request information includes uplink quality of service information, and the uplink quality of service information includes at least a part of the first pre-authorized quality of service information, or the uplink quality of service information includes a quality of service parameter obtained based on the downlink quality of service parameter of the traffic; and configuring, by the first access network device, a radio resource for the terminal based on the quality of service request information.

Embodiment 16: In the method according to Embodiment 15, the quality of service information further includes at least one of PDU session information and identification information of network slice of the traffic.

Embodiment 17: In the method according to Embodiment 9, the method further includes:

sending, by the first access network device, the reflective characteristic information of the traffic to the terminal.

Embodiment 18: In the method according to any one of Embodiments 9 to 17, the method further includes:

releasing, by the first access network device according to a traffic release request of the terminal, the radio resource allocated to the traffic, and instructing the terminal to release a radio resource configuration of the traffic; or when the first access network device detects that the traffic is terminated, releasing the radio resource allocated to the traffic, and instructing the terminal to release a radio resource configuration of the traffic.

Embodiment 19: In the method according to Embodiment 9, the receiving, by a first access network device, second quality of service information includes:

receiving, by the first access network device, a handover request message sent by a second access network device, where the handover request message includes the second quality of service information.

Embodiment 20: In the method according to Embodiment 19, the handover request message carries at least one of third indication information and data transmission indication information, where the third indication information is used to indicate whether a radio bearer has been established for a corresponding data packet group on a source side, and the data transmission indication information is used to indicate whether data of the corresponding data packet group has been transmitted or is being transmitted.

Embodiment 21: In the method according to Embodiment 19, the configuring, by the first access network device, a radio resource for a terminal based on the second quality of service information includes:

determining, by the first access network device based on at least one of the following information, whether to configure a radio resource for the terminal: whether the second access network device has established a radio bearer for the data packet group, whether data of the data packet group for which the second access network device has established a radio bearer has been transmitted, and whether the data of the data packet group for which the second access network device has established a radio bearer is being transmitted.

Embodiment 22: In the method according to any one of Embodiments 19 to 21, the method further includes:

sending, by the first access network device, a handover response message to the second access network device, where the handover response message includes a handover preparation success message and a handover preparation failure message, the handover preparation success message is used to indicate that the first access network device determines to admit all or some resources requested by the handover request message, and the handover preparation failure message is used to indicate that the first access network device determines not to admit a resource requested by the handover request message.

Embodiment 23: In the method according to Embodiment 22, the handover preparation success message and the handover preparation failure message carry a handover failure cause, where the handover failure cause is one of the following: there is no available radio resource, pre-establishment of a radio bearer with pre-authorized quality of service is not supported, a quality of service parameter is not supported, and a geographic area is not supported.

Embodiment 24: A terminal is provided, where the terminal includes a processor, a memory, and a transceiver; the processor, the memory, and the transceiver are coupled by using a bus; the memory is configured to store a program instruction; and the processor executes the program instruction stored in the memory, so that the terminal executes the method according to any one of Embodiments 1 to 8.

Embodiment 25: An access network device is provided, where the access network device includes a processor, a memory, and a transceiver; the processor, the memory, and the transceiver are coupled by using a bus; the memory is configured to store a program instruction; and the processor executes the program instruction stored in the memory, so that the access network device executes the method according to any one of Embodiments 9 to 23.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

What is claimed is:

1. A method for communication, wherein the method comprises:

sending, by a core network control plane device, quality of service (QoS) information to a radio access network device during a protocol data unit (PDU) session establishment, wherein the QoS information comprises indication information indicating that upon receiving a downlink packet, a packet filter for mapping between uplink traffic and a flow is obtained by a terminal based on the received downlink packet;

establishing, by the radio access network device, a correspondence for the terminal between the flow and a radio bearer based on the QoS information; and receiving, by the radio access network device, data that is sent from the terminal by using the radio bearer.

2. The method according to claim 1, wherein the method further comprises:

sending, by the core network control plane device, updated QoS information to the radio access network device; and updating, by the radio access network device, the QoS information by applying the updated QoS information.

3. The method according to claim 1, wherein the QoS information further comprises at least one of PDU session information or identification information of network slice.

4. The method according to claim 1, wherein the method further comprises:

sending, by the radio access network device, the indication information to the terminal.

5. The method according to claim 1, comprising:

receiving, by the radio access network device, a handover request message from another radio access network device, wherein the handover request message comprises the QoS information.

6. The method according to claim 5, wherein the handover request message carries indication information that indicates whether a radio bearer has been established for the flow on the another radio access network device.

7. The method according to claim 1, wherein the establishing, by the radio access network device, a correspondence between the flow and a radio bearer based on the QoS information for a terminal, comprises:

determining, by the radio access network device based on at least one of the following information: whether an another access network device has established a radio bearer for the flow, whether data of the flow for which the another access network device has established a radio bearer has been transmitted, or whether the data of the flow for which the another access network device has established a radio bearer is being transmitted.

8. The method according to claim 1, wherein the correspondence between the flow and the radio bearer is: a correspondence between an identifier of the flow and the radio bearer.

9. The method according to claim 1, wherein that the radio access network device sends the indication information in a data packet header to the terminal.

10. A mobile communication system, wherein the system comprises:

a core network control plane device; and a radio access network device; wherein the core network control plane device, comprises:

a first non-transitory memory storage comprising first instructions; and a first hardware processor in communication with the first non-transitory memory storage, wherein the first hardware processor executes the first instructions to:

send quality of service (QoS) information to the radio access network device during a protocol data unit (PDU) session establishment, wherein the QoS information comprises indication information indicating that upon receiving a downlink packet, a packet filter for mapping between uplink traffic and a flow is obtained by a terminal based on the received downlink packet; and the radio access network device comprises:
- a second non-transitory memory storage comprising second instructions; and
- a second hardware processor in communication with the second non-transitory memory storage, wherein the second hardware processor executes the second instructions to:
  - establish a correspondence for the terminal between the flow and a radio bearer based on the QoS information; and
  - receive data that is sent from the terminal by using the radio bearer.

11. The mobile communication system according to claim 10, wherein
the first hardware processor executes the first instructions to send updated QoS information to the radio access network device; and
the second hardware processor executes the second instructions to update the QoS information by applying the updated QoS information.

12. The mobile communication system according to claim 10, wherein the QoS information further comprises at least one of PDU session information or identification information of network slice.

13. The mobile communication system according to claim 10, wherein
the second hardware processor executes the second instructions to send the indication information to the terminal.

14. The mobile communication system according to claim 10, wherein the second hardware processor executes the second instructions to receive a handover request message from another radio access network device, wherein the handover request message comprises the QoS information.

15. The mobile communication system according to claim 14, wherein the handover request message carries indication information that indicates whether a radio bearer has been established for the flow on the another radio access network device.

16. The mobile communication system according to claim 10, wherein the second hardware processor executes the second instructions to:
determine, based on at least one of the following information: whether an another access network device has established a radio bearer for the flow, whether data of the flow for which the another access network device has established a radio bearer has been transmitted, or whether the data of the flow for which the another access network device has established a radio bearer is being transmitted.

17. The mobile communication system according to claim 10, wherein the correspondence between the flow and the radio bearer is: a correspondence between an identifier of the flow and the radio bearer.

18. The mobile communication system according to claim 10, wherein the second hardware processor executes the second instructions to send the indication information to the terminal in a data packet header.

* * * * *